(12) United States Patent
Brady

(10) Patent No.: US 9,636,723 B2
(45) Date of Patent: May 2, 2017

(54) HIGH RESOLUTION MODULAR HEATING FOR SOIL EVAPORATIVE DESORPTION

(71) Applicant: RETERRO, INC., Pleasanton, CA (US)

(72) Inventor: Patrick Richard Brady, Sisters, OR (US)

(*) Notice: Subject to any disclaimer, the term of this patent is extended or adjusted under 35 U.S.C. 154(b) by 297 days.

(21) Appl. No.: 14/488,318

(22) Filed: Sep. 17, 2014

(65) Prior Publication Data
US 2015/0078830 A1   Mar. 19, 2015

Related U.S. Application Data

(63) Continuation-in-part of application No. 14/264,019, filed on Apr. 28, 2014, now Pat. No. 9,364,877.

(60) Provisional application No. 62/048,794, filed on Sep. 10, 2014, provisional application No. 61/878,623, filed on Sep. 17, 2013.

(51) Int. Cl.
*B09C 1/06* (2006.01)

(52) U.S. Cl.
CPC ..................... *B09C 1/06* (2013.01)

(58) Field of Classification Search
CPC .............. B09C 1/06; B09C 1/005; F23G 7/14
See application file for complete search history.

(56) References Cited

U.S. PATENT DOCUMENTS

| | | | | |
|---|---|---|---|---|
| 4,738,206 A | * | 4/1988 | Noland | B09C 1/06 110/226 |
| 4,834,840 A | * | 5/1989 | Capella | B01D 1/26 159/47.3 |
| 4,842,448 A | * | 6/1989 | Koerner | B09C 1/06 405/128.35 |
| 4,864,942 A | * | 9/1989 | Fochtman | B09B 3/0091 110/226 |
| 4,977,839 A | * | 12/1990 | Fochtman | B09B 3/0091 110/226 |
| 5,035,537 A | * | 7/1991 | Rose | C09K 3/32 405/128.7 |
| 5,067,852 A | * | 11/1991 | Plunkett | B09C 1/005 405/128.1 |
| 5,213,445 A | * | 5/1993 | Ikenberry | B09C 1/06 405/128.4 |

(Continued)

FOREIGN PATENT DOCUMENTS

WO   WO 2015042198 A1 * 3/2015 ............... B09C 1/06

*Primary Examiner* — Benjamin Fiorello
*Assistant Examiner* — Aaron Lembo
(74) *Attorney, Agent, or Firm* — Tue Nguyen

(57) ABSTRACT

Disclosed is a method and a system of high resolution modular heating for soil evaporative desorption. In one embodiment, a soil box comprising contaminated soil is mounted within a treatment chamber. Heated gas are directed into the soil box through a plurality of injection ports. A heat front from the heated gas desorbs the surrounding contaminated soil. The delivery of the heated gas may be in sections and independently controlled among the plurality of injection ports. A bottom section of the soil box is heated prior to a top section to minimize or reduce condensation formation within lower areas of the soil box, thereby creating roadways of desiccated, heated, and/or cracked soil at the bottom section. Vaporized contaminants from the top section is able to flow freely through the roadways to get to an exit pathway at the bottom of the soil box.

15 Claims, 18 Drawing Sheets

(56) References Cited

U.S. PATENT DOCUMENTS

| | | | | |
|---|---|---|---|---|
| 5,228,804 A * | 7/1993 | Balch | F23G 7/14 | |
| | | | 405/128.6 | |
| 5,230,167 A * | 7/1993 | Lahoda | B09B 3/0091 | |
| | | | 34/75 | |
| 5,261,765 A * | 11/1993 | Nelson | B09C 1/06 | |
| | | | 405/128.6 | |
| 5,466,418 A * | 11/1995 | Swanson | B09C 1/06 | |
| | | | 405/128.85 | |
| 5,639,936 A * | 6/1997 | Corte | B09C 1/06 | |
| | | | 204/157.15 | |
| 5,836,718 A * | 11/1998 | Price | B09C 1/06 | |
| | | | 210/909 | |
| 5,893,680 A * | 4/1999 | Lowry | B09C 1/005 | |
| | | | 405/128.2 | |
| 5,904,904 A * | 5/1999 | Swanson | B09C 1/06 | |
| | | | 422/182 | |
| 6,000,882 A * | 12/1999 | Bova | B09C 1/06 | |
| | | | 405/128.85 | |
| 7,618,215 B2 * | 11/2009 | Haemers | B09C 1/06 | |
| | | | 405/128.8 | |
| 8,348,551 B2 * | 1/2013 | Baker | B09C 1/08 | |
| | | | 209/370 | |
| 8,851,066 B1 * | 10/2014 | Kapteyn | F24J 2/34 | |
| | | | 126/620 | |
| 9,004,817 B2 * | 4/2015 | Hanasaka | H05B 6/107 | |
| | | | 405/128.85 | |
| 2003/0147697 A1 * | 8/2003 | Brady | B09C 1/06 | |
| | | | 405/128.15 | |
| 2014/0321915 A1 * | 10/2014 | Brady | B09C 1/08 | |
| | | | 405/128.75 | |
| 2014/0321918 A1 * | 10/2014 | Brady | B09C 1/06 | |
| | | | 405/128.85 | |
| 2014/0377008 A1 * | 12/2014 | Desmarais | B09C 1/06 | |
| | | | 405/128.85 | |
| 2015/0078827 A1 * | 3/2015 | Brady | B09C 1/005 | |
| | | | 405/128.75 | |
| 2015/0078828 A1 * | 3/2015 | Brady | B09C 1/06 | |
| | | | 405/128.85 | |
| 2015/0078829 A1 * | 3/2015 | Brady | B09C 1/06 | |
| | | | 405/128.85 | |

* cited by examiner

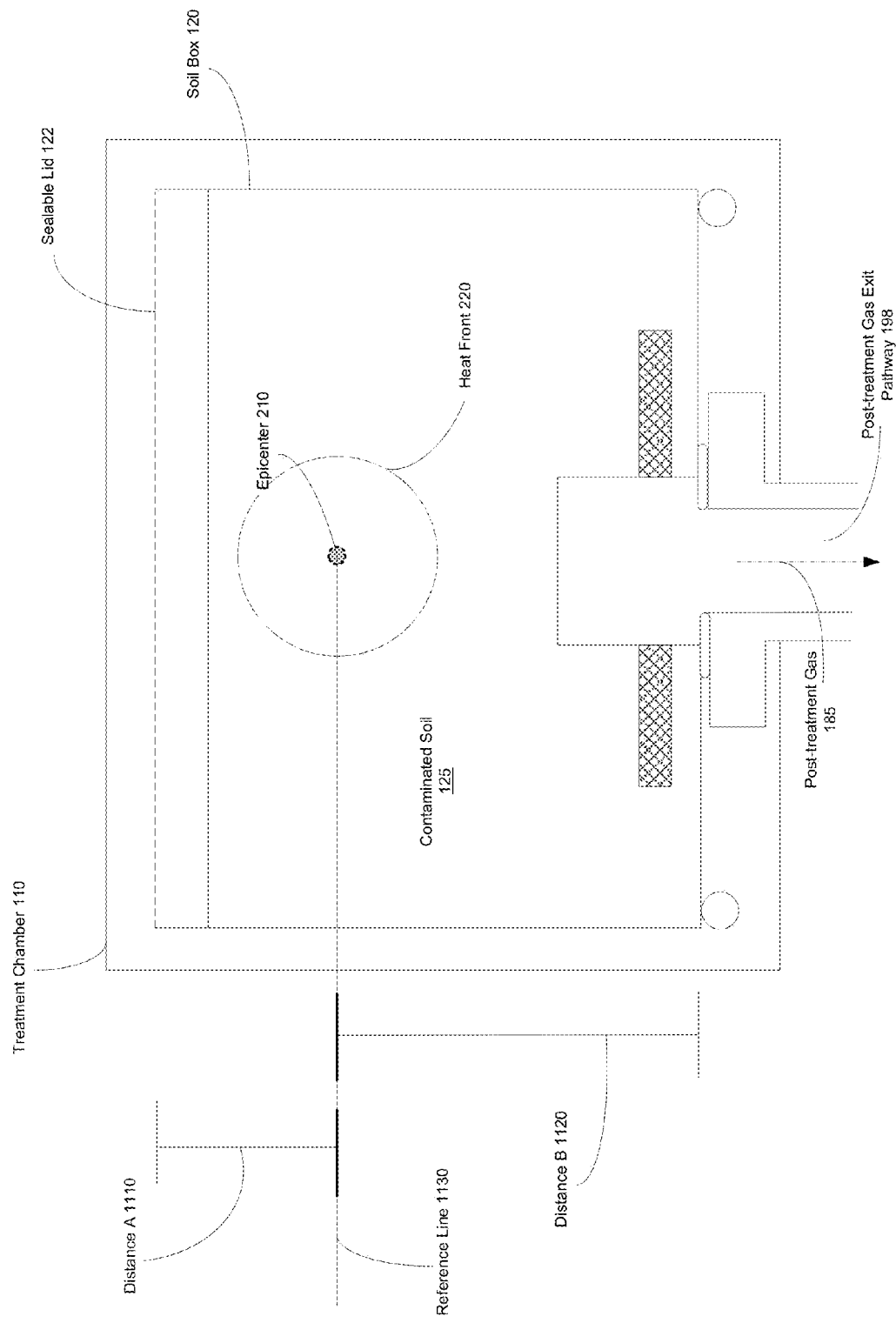

```
┌─────────────────────────────────────────────────────────┐
│  Mount a soil box comprising contaminated soil within a │
│                     treatment chamber                   │
│                          1510                           │
└─────────────────────────────────────────────────────────┘
                            │
                            ▼
┌─────────────────────────────────────────────────────────┐
│    Inject pre-treatment gas into the soil box sequentially │
│                          1520                           │
└─────────────────────────────────────────────────────────┘
                            │
                            ▼
┌─────────────────────────────────────────────────────────┐
│    Progressively increase or progressively decrease the │
│              temperature of the pre-treatment gas       │
│                          1530                           │
└─────────────────────────────────────────────────────────┘
                            │
                            ▼
┌─────────────────────────────────────────────────────────┐
│        Discharge post-treatment gas out of the soil box │
│                          1540                           │
└─────────────────────────────────────────────────────────┘
```

Fig. 15

Mount a soil box comprising contaminated soil within a treatment chamber
1710

Close an exhaust valve at a post-treatment gas exit pathway
1720

Inject pre-treatment gas into the soil box
1730

Open the exhaust valve at the post-treatment gas exit pathway
1740

Discharge post-treatment gas out of the soil box
1750

Fig. 17

```
Mount a soil box comprising contaminated soil within a treatment
                         chamber
                          1810
                            │
                            ▼
        Close an exhaust valve at a post-treatment gas exit pathway
                          1820
                            │
                            ▼
        Inject pre-treatment gas into the soil box (raising its temperature
                         and pressure)
                          1830
                            │
                            ▼
        Stop the injection of pre-treatment gas into the soil box
               (maintaining its temperature and pressure)
                          1840
                            │
                            ▼
         Open the exhaust valve at the post-treatment gas exit pathway
                          1850
                            │
                            ▼
              Discharge post-treatment gas out of the soil box
                          1860
```

Fig. 18

HIGH RESOLUTION MODULAR HEATING FOR SOIL EVAPORATIVE DESORPTION

CLAIMS OF PRIORITY

This patent application is a continuation-in-part and claims priority from:
(1) U.S. provisional patent application No. 62/048,794, filed on Sep. 10, 2014, entitled "Feedback loop control for soil evaporative desorption", which is incorporated herein by reference.
(2) U.S. utility patent application Ser. No. 14/264,019, filed on Apr. 28, 2014, entitled "Soil box for evaporative desorption process", which is incorporated herein by reference.
(3) U.S. provisional patent application No. 61/878,623, filed on Sep. 17, 2013, entitled "Cyclic thermal desorption processes", which is incorporated herein by reference.
(4) U.S. utility patent application Ser. No. 13/419,195, filed on Mar. 3, 2012, entitled "Evaporative desorption high concentration soil contaminate removal and contaminate reclamation apparatus and process", which is incorporated herein by reference.

FIELD OF TECHNOLOGY

This disclosure relates generally to contaminated soil reclamation and/or remediation and, more particularly, to a method and a system of high resolution modular heating for soil evaporative desorption.

BACKGROUND

The use of petroleum hydrocarbons as a fuel source is ubiquitous in society. Consequently, petroleum hydrocarbon products are stored and handled in great quantities. One risk associated with the storage and handling of petroleum hydrocarbons is the potential for spillages during handling or the potential for leakage during storage. Due to the negative environmental impact associated with spills and leakages of petroleum hydrocarbons, rules have been established at the local, state and federal levels. These rules primarily focus on preventing petroleum hydrocarbon releases to the environment from occurring. These rules also have provisions that require the responsible party to remediate petroleum hydrocarbon releases to the environment.

In the field of petroleum hydrocarbon remediation from soil, there are two basic approaches: applying a treatment technique to soil in place (in-situ), or applying a treatment technique to excavated soil (ex-situ). There are advantages and disadvantages for each approach and the selection of the approach is based on the site-specific circumstances of each petroleum hydrocarbon release.

In-situ thermal desorption technologies may include techniques that involve applying heat and vacuum simultaneously to subsurface soils to vaporize volatile contaminates in the soil. Processes of vaporizing of contaminates may include evaporation into the subsurface air stream, steam distillation into the water vapor stream, boiling, oxidation, and/or pyrolysis. The vaporized water, contaminants, and organic compounds are drawn by the vacuum in a counter-current direction to the flow of heat into the source of vacuum.

Ex-situ thermal desorption technologies may include techniques that involve mechanical agitation of the soil during the heating process, which involve mechanical agitation and operate in a continuous process where the soil is continuously introduced to the process and is mechanically moved through the process apparatus until treatment is complete, and then is continuously discharged to a container for disposal or re-use.

Alternatively, the soil may be treated in a static configuration, in which a given amount of soil is introduced to the treatment chamber. The soil configurations may include pile arrangement and container arrangements.

Nearly all the prior art processes use combustion of fossil fuel as a heat source. This may have the consequence of forming products of incomplete combustion, oxides of nitrogen, and other greenhouse gases as a by-product. Combustion also has the potential to add unburned hydrocarbons to the process exhaust gas if strict control of the combustion process is not maintained.

There is a need for an ex-situ static process that is labor, time and energy efficient in the treatment process, and is environmentally friendly.

SUMMARY

Disclosed are a method and system of high resolution modular heating for soil evaporative desorption.

In one or more embodiment, a soil evaporative desorption process is disclosed. A treatment process comprise placing a contaminated soil batch into a soil box, which is then mounted within a treatment chamber. The treatment chamber and/or the soil box may be heat insulated and/or sealed to hold pressure. One or more injection port may direct pre-treatment gas into the soil box from a heat source used to heat the pre-treatment gas. A heat front from the pre-treatment gas may desorb surrounding contaminated soil. Post-treatment gas may be the resultant product of the desorption process, which leaves through a post-treatment gas exit pathway.

The soil box may be configured to receive pre-treatment gas from the injection port at different sections and at different times. A bottom section may be configured to receive pre-treatment gas before a top section receives pre-treatment gas. Treating the bottom section before treating the top section may eliminate condensation within the soil box, thereby creating roadways of desiccated, heated, and/or cracked soil at the bottom section, which may allow vaporized contaminates from the top section to flow through. In one or more embodiment, a parameter of the post-treatment gas leaving through the post-treatment gas exit pathway may be measured through a parameter sensor. The data output from the sensor may indicate conditions of a particular area of the contaminated soil, such as a high carbon monoxide concentration reading may suggest that the treatment was incomplete or inefficient. Further actions may be taken, such as to re-run the treatment again.

In one or more embodiment, systems and methods to treat contaminated soil are provided, including a cyclic process of pressure and/or temperature. A sealable treatment chamber may be used with an exhaust valve configured to release post-treatment gas in a manner that permits the soil box to alternate between a pressurized state and a pressure-releasing state. For example, hot gas or air may be provided to the treatment chamber with the exhaust valve close for heating the contaminated soil with increasing pressure. The exhaust valve may be open, with the hot air still on or shut off, to release the pressure and the hot gas from the treatment chamber. The quick release of hot gas may extract the vaporized contaminants, bringing the volatile contaminants to the exhaust. The cycle may be repeated until the contaminated soil is cleaned.

The exhaust line may be coupled to an atmospheric pressure environment, which may drive the treatment chamber to a lower pressure if the chamber is pressured to a higher than atmospheric pressure. Alternatively, the exhaust line may be coupled to a vacuum, which may extract gas from the treatment chamber. When the exhaust valve is shut off, hot gas, which may be provided to the treatment chamber, may bring the pressure of the treatment chamber up, for example to atmospheric pressure or higher than atmospheric pressure. The opening of the exhaust valve may remove the hot gas from the treatment chamber, and lower the pressure of the treatment chamber to below atmospheric pressure. The cycle may be repeated until the contaminated soil is cleaned.

In one or more embodiment, the soil in the treatment chamber may be configured to provide high flow conductance, which may assist in lowering the chamber pressure, e.g., lower the time to bring the chamber pressure to a low pressure regime. For example, rocks may be provided to the soil, which may provide air holes within the soil to allow faster gas flow through the soil.

In one or more embodiment, the temperature of the treatment chamber may be cycling, for example, by alternatingly flowing hot gas and stopping flowing hot gas (such as flowing room temperature gas or stopping the hot gas from flowing). The cyclic temperature treatment of the contaminated soil may provide pulse soil treatment while reducing energy consumption.

BRIEF DESCRIPTION OF THE DRAWINGS

The embodiments of this invention are illustrated by way of example and not limitation in the figures of the accompanying drawings, in which like references indicate similar elements and in which:

FIG. 11 is yet another alternative modular heating configuration of the soil box comprising only a single modular heater, according to one or more embodiment.

FIG. 15 is a flowchart of a method of injecting pre-treatment gas into the soil box, according to one or more embodiment.

FIG. 17 is a flowchart of a method of raising pressure within the soil box before discharging the post-treatment gas using an exhaust valve, according to one or more embodiment.

FIG. 18 is a flowchart of a method of maintaining pressure within the soil box before discharging the post-treatment gas using the exhaust valve, according to one or more embodiment.

Other features of the present embodiments will be apparent from the accompanying drawings and from the detailed description that follows.

DETAILED DESCRIPTION

Disclosed are a method, a system, and/or an apparatus of high resolution modular heating for soil evaporative desorption. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

Figure 1:
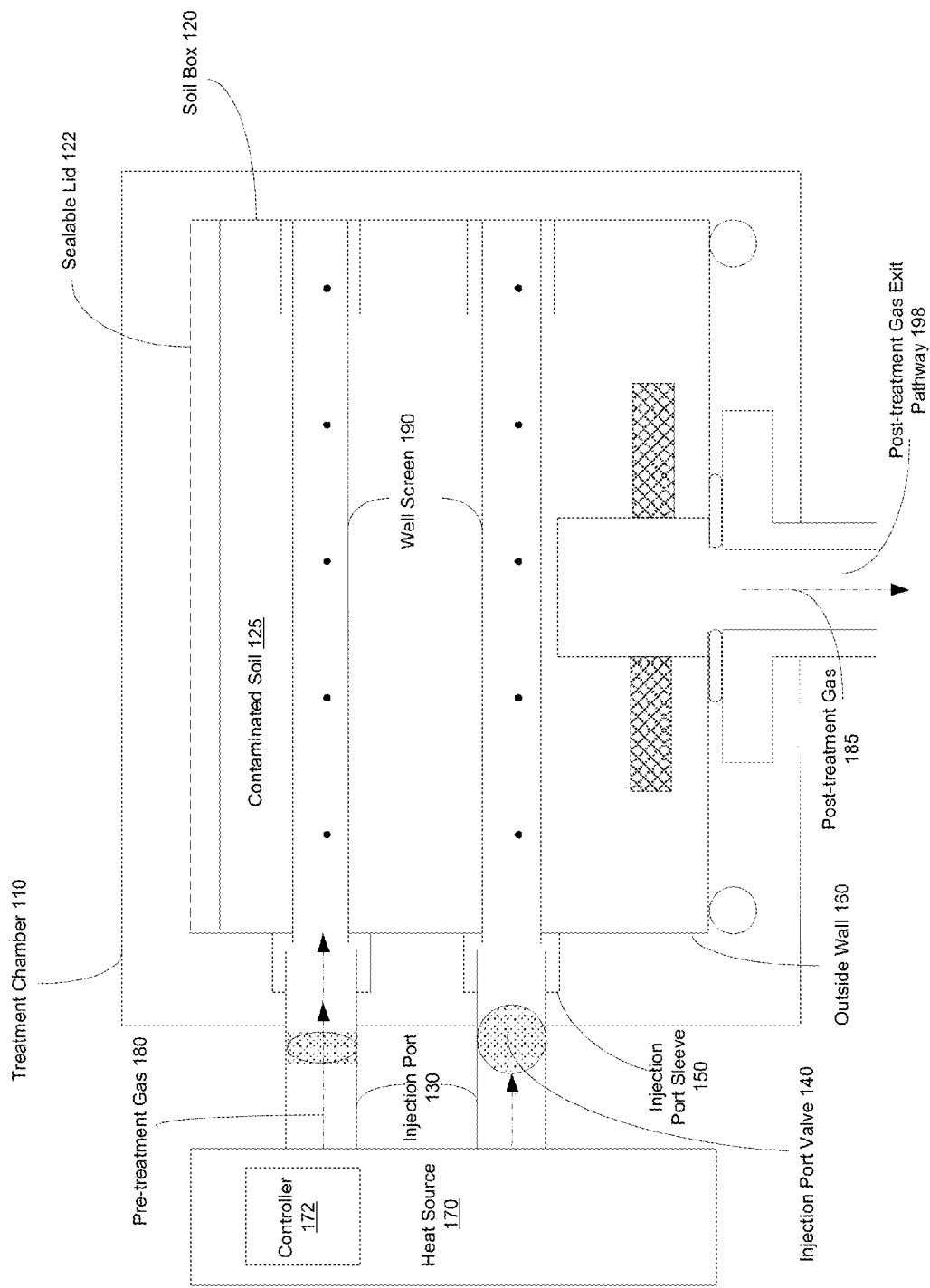
FIG. 1 illustrates a soil box configured to receive pre-treatment gas from a heat source, according to one or more embodiment.

FIG. 1 illustrates a soil box configured to receive pre-treatment gas from a heat source, according to one or more embodiment.

In particular, FIG. 1 describes a treatment chamber 110, a soil box 120, a sealable lid 122, a contaminated soil 125, an injection port 130, an injection port valve 140, an injection port sleeve 150, an outside wall 160, a heat source 170, a controller 172, a pre-treatment gas 180, a post-treatment gas 185, a well screen 190, and a post-treatment gas exit pathway 198.

The soil box 120 may be configured to hold contaminated soil 125, and may be mounted within a treatment chamber 110. The treatment chamber 110 may be a chamber designed to allow pre-treatment gas 180 to enter to heat the contaminated soil 125. The soil box 120 may be a compartment designed to hold contaminated soil 125 to be treated in an evaporative desorption process. The treatment chamber 110 may be insulated to hold heat and/or sealed to hold pressure within the treatment chamber 110. The soil box 120 may also be insulated to hold heat and/or may comprise a sealable lid 122 operable to hold pressure within the soil box 120. The soil box 120 may comprise an exhaust valve 310 of FIG. 3 configured to release post-treatment gas 180 from the soil box 120 in a manner that permits the soil box 120 to alternate between a pressurized state and a pressure-releasing state. The treatment chamber 110 and/or the soil box 120 may function similarly to a hyperbaric chamber. The contaminated soil 125 may be saturated with low concentration and/or high concentration hydrocarbon contaminates excavated from a dig site.

Pre-treatment gas 180 may be provided directly into the well screen 190 of the soil box 120 through the injection port 130. The well screen 190 may be a cylindrical system of mesh screens and/or holes designed to allow pre-treatment gas 180 to enter from the injection port 130 and flow through to contaminated soil 125. The injection port 130 may be a tubular section or hollow cylinder used to convey pre-treatment gas 180 from the heat source 170. The heat source 170 may be an electrical heater and/or a natural gas heater used to heat the pre-treatment gas 180 prior to injection into the treatment chamber 110. The heat source 170 may comprise a controller 172, such as a programmable logic controller (PLC), which may be used to independently control each injection port 130, if more than one is used, and to adjust temperature and/or flow of the pre-treatment gas 180 passing through the injection port 130. The injection port 130 may comprise the injection port valve 140 used to control the injection of pre-treatment gas 180 into the well screen 190 of the soil box 120. For example, the injection port valve 140 may open to permit pre-treatment gas 180 to flow from the heat source 170 into the soil box 120, or it may close to deny the flow of pre-treatment gas 180 from the heat source 170 into the soil box 120. The operation of the injection port valve 140 may be mechanically controlled though manual adjustment of the injection port valve 140 and/or electronically controlled, such as through the controller 172.

In addition, the injection port 130 may comprise an injection port sleeve 150 that connects the injection port 130 to the outside wall 150 of the soil box 120. The injection port sleeve 150 may be retractable or it may be structurally fixed to the injection port 130.

After completion of treatment of a soil batch, post-treatment gas 185 may exit the soil box 120 and treatment chamber 110 through the post-treatment gas exit pathway 198. The post-treatment gas 185 may be further processed in a reclamation system that may comprise condensing condensable hydrocarbon contaminates extracted from the contaminated soil 125. The reclamation process may further comprise using non-condensed condensable hydrocarbon contaminates and/or non-condensable hydrocarbon contaminates to re-heat the post-treatment gas 185 to be recycled as pre-treatment gas 180 and/or heat fresh air to be used as pre-treatment gas 180.

Figure 2:
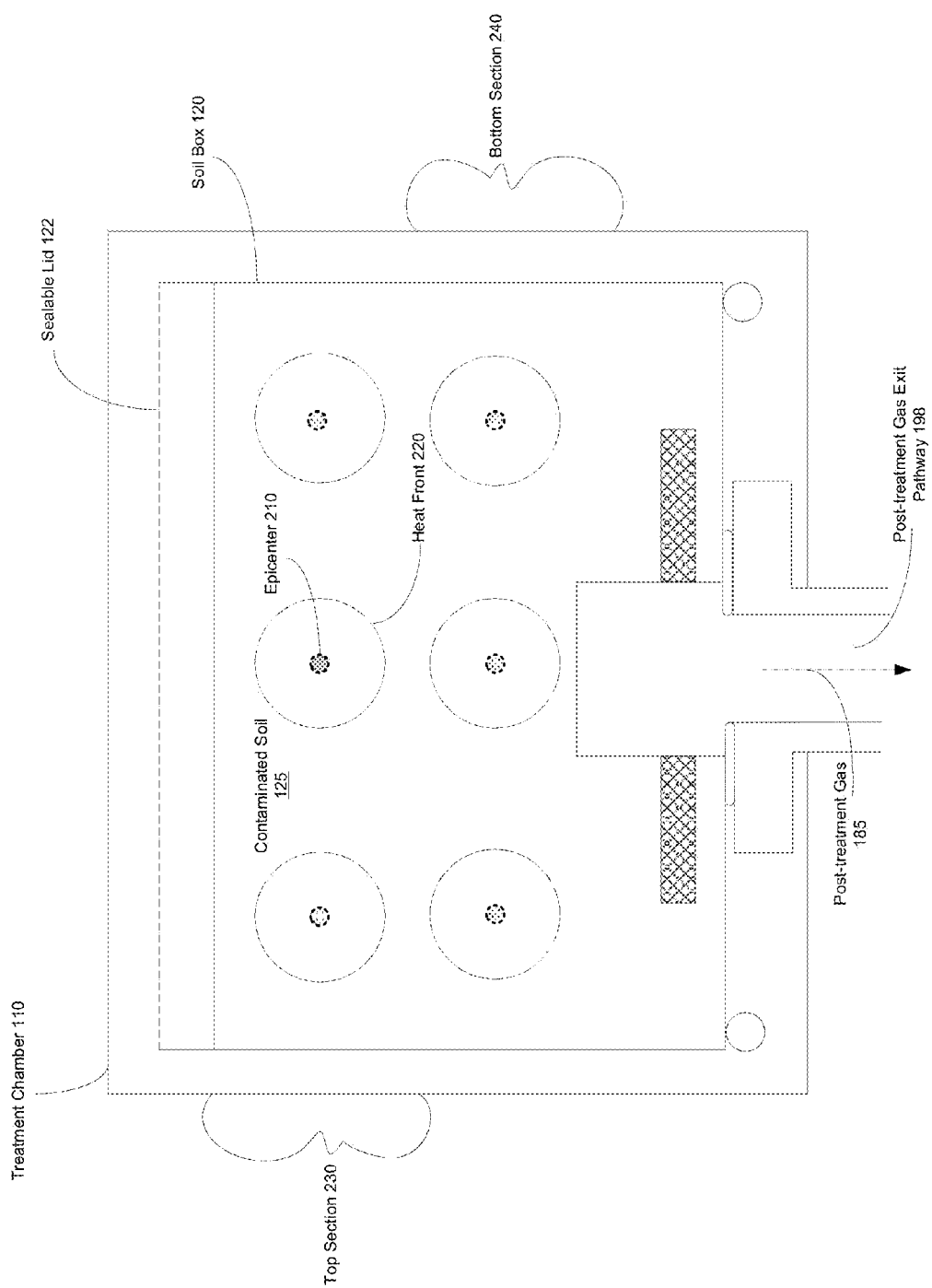
FIG. 2 shows a modular heating configuration of the soil box of FIG. 1, according to one or more embodiment.

FIG. 2 shows a modular heating configuration of the soil box 120 of FIG. 1, according to one or more embodiment.

Particularly, FIG. 2 introduces an epicenter 210, a heat front 220, a top section 230, and a bottom section 240.

The epicenter 210 may be the central point of heat disposal into the contaminated soil 125. The injection port 130 may direct pre-treatment gas 180 into well screen 190, which may then dispose the pre-treatment gas 180 into the contaminated soil 125. The epicenter 210 may be defined as the central point where pre-treatment gas 180 exits the well screen 190 and disperses into the contaminated soil 125. The heat front 220 emanating from the epicenter 210 may progressively decrease in temperature with distance, thereby lowering its effectiveness in desorbing the contaminated soil 125. The heat front 220 may be limited to a distance of approximately 18 to 24 inches, depending on soil type, temperature, contaminate type, etc. The limiting of the distance of the heat front 220 may be mechanically controlled through the injection port valve 140, a valve of the well screen 190, and/or through mechanical adjustment of the output of the heat source 170. The limiting of the distance of the heat front 220 may also be electronically controlled, such as through the controller 172.

The modular heating configuration of the soil box may be partitioned into a top section 230 and a bottom section 240. In one or more embodiment, the top section 230 and the bottom section 240 may comprise of at least one epicenter 210 in each section (two or more total epicenter 210). In one or more alternative embodiment, the top section 230 and the bottom section 240 may be partitioned from a single epicenter 210, which is divided into two halves—a top half representing the top section 230 and a bottom half representing the bottom section 240.

The bottom section 240 may be configured to receive pre-treatment gas 180 before the top section 230 receives pre-treatment gas 180, and vice versa. The top section 230 may be configured to begin receiving pre-treatment gas 180 only after the completion of treatment on a soil batch at the bottom section 240, and vice versa. However, the onset of receiving pre-treatment gas 180 at the top section 230 may also be synchronized with the onset of receiving pre-treatment gas 180 at the bottom section 240. Additionally, the onset of receiving pre-treatment gas 180 at the top section 230 may be delayed after the onset of receiving pre-treatment gas 180 at the bottom section 240, and vice versa. For example, the onset of receiving pre-treatment gas 180 at the top section 230 may be configured to be delayed by an arbitrary time interval such as, e.g. 5 minutes, 10 minutes, 20 minutes, and etc., after the onset of receiving pre-treatment gas 180 at the bottom section 240. The same may be done the other way around, whereby the onset of receiving pre-treatment gas 180 at the bottom section 240 may be configured to be delayed by an arbitrary time interval after the onset of receiving pre-treatment gas 180 at the top section 230. The onset of receiving pre-treatment gas 180 at the top section 230 and the onset of receiving pre-treatment gas 180 at the bottom section 240 may be controlled mechanically and/or electronically, similar to the limiting of the distance of the heat front 220 described above.

In one or more embodiment, the top section 230 and the bottom section 240 both may comprise two or more epicenter 210. The disposing of the heat front 220 from the dispersal of pre-treatment gas 180 at each epicenter 210 may be sequential or simultaneous, or varying with respect to particular sets of epicenter 210. For example, using the configuration of FIG. 2 with six total epicenter 210 (three epicenter 210 at the top section 230 and three epicenter 210 at the bottom section 240), the bottom right epicenter 210 may dispose heat front 220 first, followed by an arbitrary time interval such as, e.g. 5 minutes or 10 minutes, before the bottom center epicenter 210 disposes heat front 220. After another arbitrary time interval such as, e.g. 3 minutes or 6 minutes, the bottom right epicenter 210 may dispose heat front 220.

The three epicenter 210 at the top section 230 may be configured in a similar fashion. Sequences of disposing heat front 220 may intertwine epicenter 210 from the top section 230 with epicenter 210 from the bottom section 240. Another example is to configure the top center epicenter 210 and the top right epicenter 210 to simultaneous dispose heat front 220 before the bottom left epicenter 210 disposes heat front 220. The top left epicenter 210 and the bottom right epicenter 210 may dispose heat front 220 simultaneously or sequentially thereafter. In other words, any combination and pattern of disposing heat front 220 among all the epicenter 210 of the top section 230 and the bottom section 240 may be employed. A particular combination or pattern of disposing heat front 220 among all the epicenter 210 may be dependent upon the stage of treatment of a soil batch and/or the conditions that the treatment process is operating under such as, e.g. soil type, temperature, contaminate type, etc.

In one or more embodiment, the top section 230 and the bottom section 240 of the soil box 120 may be employed to desorb contaminated soil 125 from within the soil box 120 at different sections at different times. The one or more epicenter 210 at the bottom section 240 of the soil box 120 may dispose heat front 220 prior to the one or more epicenter 210 at the top section 230 disposes heat front 220 in order to create a roadway of desiccated, heated, and/or cracked soil at the bottom section 240 of the contaminated soil 125 so that the vaporized contaminates at the top section 230 may travel through the roadway when the epicenter 210 at the top section 230 disposes heat front 220 into the surrounding contaminated soil 125.

The disposing of heat front 220 through the releasing of pre-treatment gas 180 from the well screen 190 may be pulsated to avoid conditions such as, e.g. air flow, pressure, etc., to approach or remain in steady state. A steady state system may be a system that has at least one property or condition that is unchanging. A pulsing injection of pre-treatment gas 180 may raise entropy within the soil box and may help dislodge contaminates and/or particles from the contaminated soil 125, thereby opening roadways for the contaminates to flow through, ultimately resulting in higher efficiency of the desorption process.

In addition to the ability to release pre-treatment gas 180 to the contaminated soil 125 in the pulsing manner, the temperature of the pre-treatment gas 180 may be progressively raised or progressively lowered through subsequent injections of pre-treated gas 180 through adjustments of the heat source 170. The flow of pre-treatment gas 180 into the soil box 120 may be progressively raised or progressively lowered through adjustments of an extraction fan. Each epicenter 210 may be independently controlled so that different sections of the contaminated soil 125 may receive different treatment with respect to temperature and/or flow. The exhaust valve 310 of FIG. 3 may be closed to withhold accumulated pressure within the soil box 120 and/or the treatment chamber 110 from the injection of pre-treatment gas 180.

Figure 3:
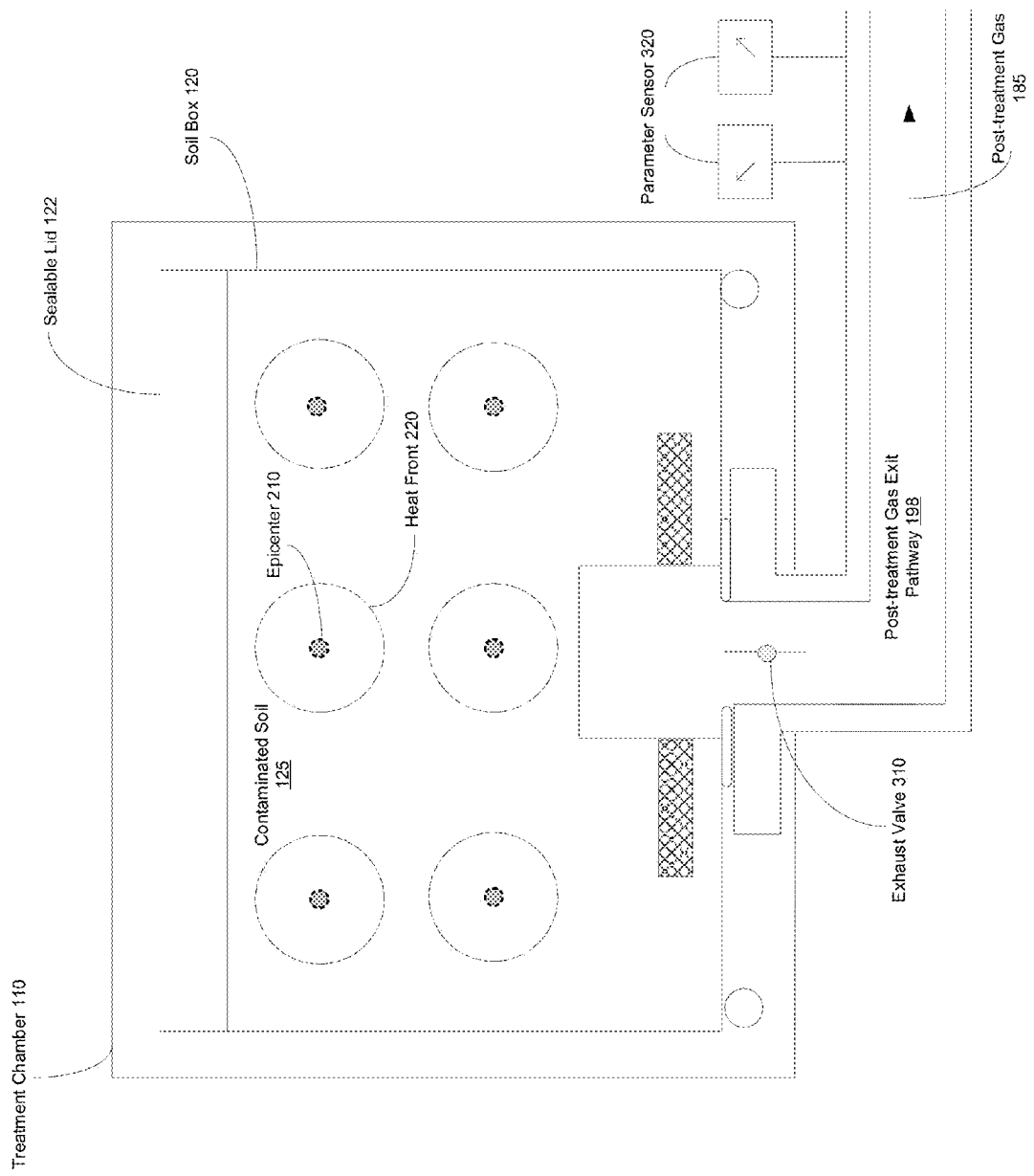
FIG. 3 shows the modular heating configuration of FIG. 2 used to detect and/or measure a parameter of a post-treatment gas, according to one or more embodiment.

FIG. 3 shows the modular heating configuration of FIG. 2 used to detect and/or measure a parameter of a post-treatment gas 185, according to one or more embodiment.

Particularly, FIG. 3 introduces an exhaust valve 310 and a parameter sensor 320, according to one or more embodiment.

The exhaust valve 310 may be positioned at the post-treatment gas exit pathway 198. Post-treatment gas 185 may be the resultant product of the pre-treatment gas 180 passing through contaminated soil 125, thereby vaporizing volatile hydrocarbon contaminates. The post-treatment gas 185 may comprise condensable hydrocarbon contaminates and/or non-condensable hydrocarbon contaminates. The parameter sensor 320 may be configured to detect and/or monitor one or more parameters of the post-treatment gas 185 as it flows from the treatment chamber 110. Parameters of the post-treatment gas 185 may comprise carbon monoxide concentration, oxygen concentration, hydrocarbon concentration, temperature, flow, and/or humidity. A feedback mechanism may be employed to adjust parameters of the pre-treatment gas 180 based on the inputs from parameter sensor 320.

In one or more embodiment, a method of heating sections of contaminated soil 125 in the soil box 120 is disclosed. An injection port 130 may direct pre-treatment gas 180 from a heat source 170 into well screen 190. An epicenter 210 may dispose heat front 220 into the surrounding contaminated soil 125, thereby evaporating volatile hydrocarbon contaminates, which may then flow out of the soil box 120 and treatment chamber 110 through the post-treatment gas exit pathway 198 as post-treatment gas 185.

The heating of individual areas of contaminated soil 125 may be configured to release pre-treatment gas 180 into the surrounding contaminated soil 125 at a single area at a time. Once heat front 220 emanating from epicenter 210 desorbs contaminates from a target area of the contaminated soil 125, the parameter sensor 320 may detect and/or measure one or more parameter of the resultant post-treatment gas 185 flowing by. Data inputs from the parameter sensor 320 may be used to identify and analyze the content of the single area of contaminated soil 125 that is being heated. For example, if the parameter sensor 320 indicates that there is a high level of carbon monoxide concentration in the post-treatment gas 185 coming from the single area, which may indicate incomplete treatment of the single area, then additional pre-treatment gas 185 may be injected into that single area of contaminated soil 125 until a lower carbon monoxide reading from parameter sensor 320 is achieved.

The same may be done for any of the parameters mentioned above. A low flow reading from parameter sensor 320 may indicate that the single area of contaminated soil 125 may be clogged, or that the injection port 130 and/or the well screen 190 responsible for the heat front 220 for the single area may be clogged. A high humidity reading from parameter sensor 320 may indicate that the single area of contaminated soil 125 may have high moisture content, and vice versa.

Figure 4:
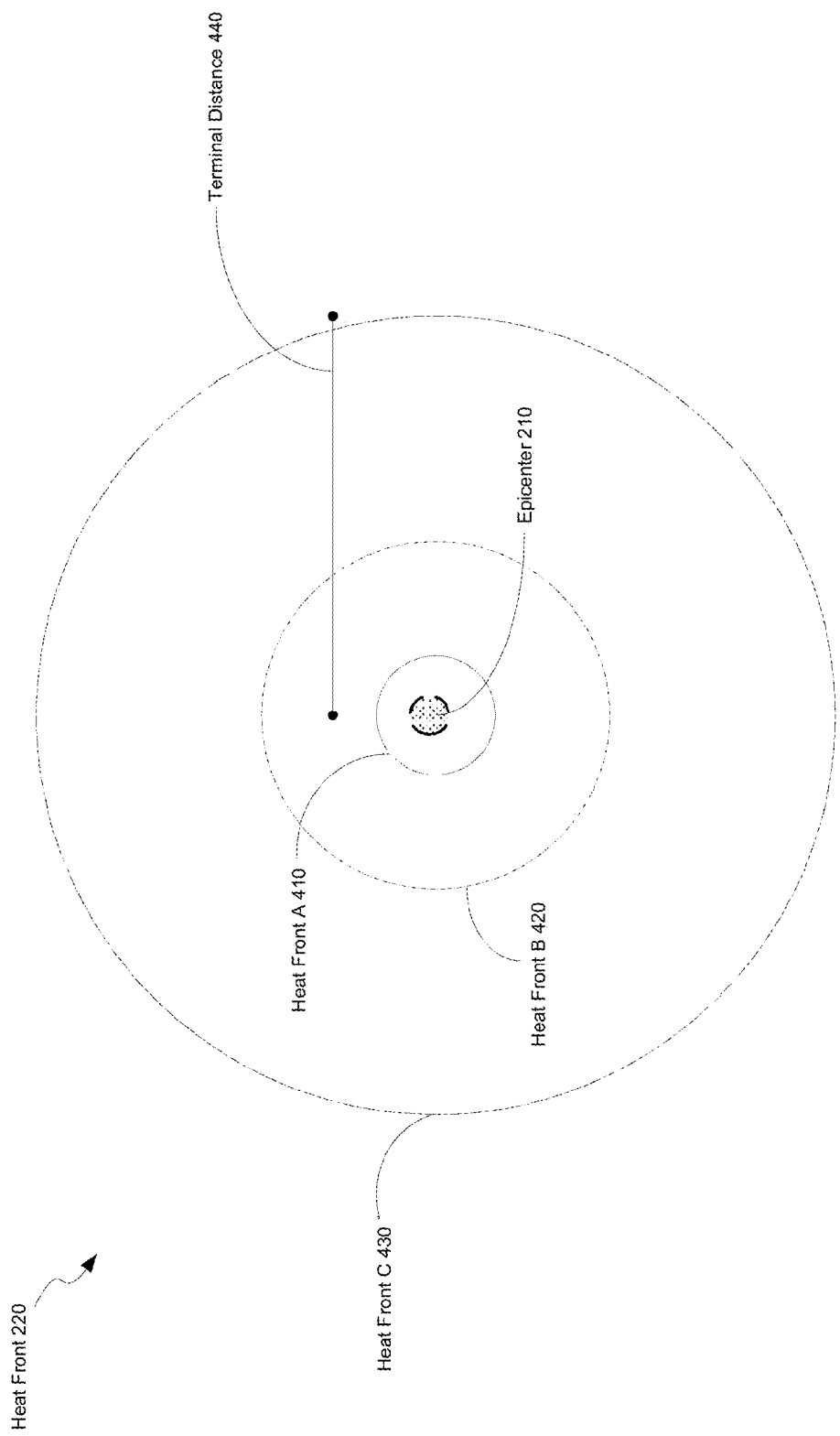
FIG. 4 is a schematic representation of varying heat fronts of an epicenter of the modular heating configuration of FIG. 2, according to one or more embodiment.

FIG. 4 is a schematic representation of varying heat fronts of the epicenter 210 of the modular heating configuration of FIG. 2, according to one or more embodiment.

Particularly, FIG. 4 introduces a heat front A 410, a heat front B 420, a heat front C 430, and a terminal distance 440.

The epicenter 210 of FIG. 2 may dispose heat front 220 into the contaminated soil 125.

Heat front A 410 may be an arbitrarily set distance from epicenter 210. Heat front A 410 may be higher in temperature than heat front B 420, both of which may be higher in temperature than heat front C 430, all of which may be higher in temperature than terminal distance 440. Terminal distance 440 may be defined as the effective distance of heat front 220 measured from epicenter 210. The contaminated soil 125 residing beyond the terminal distance 440 of an epicenter 210 may not be affected from the treatment process.

In one or more embodiment, the soil box 120 comprising modular heating configuration is disclosed. The modular heating configuration may comprise one or more epicenter 210 to dispose heat front 220 into contaminated soil 125 within the soil box 120. The heat front 220 may have a limited terminal distance 440, such as e.g., 18 inches, 20 inches or 25 inches. The terminal distance 440 may be manually limited to a desired distance. The limiting of the distance of the heat front 220 may be mechanically controlled through the injection port valve 140, a valve of the well screen 190, and/or through mechanical adjustment of the output of the heat source 170. The limiting of the distance of the heat front 220 may also be electronically controlled, such as through controller 172.

Multiple epicenter 210 may be strategically spaced apart for an optimal desorption treatment heating condition. For example, two epicenter 210 may be spaced in a manner that allows maximal heat coverage of the contaminated soil 125.

This space may be a distance of two times the terminal distance 440 of an epicenter 210, such as e.g., 36 inches, 40 inches or 50 inches, to coincide with the above example distances of terminal distance 440. However, other configurations may be desirable. For instance, if the type of soil, moisture content, contaminates, and/or environmental conditions of a treatment procedure renders heat front C 430 ineffective, then the optimal distance between multiple epicenter 210 may be configured in a manner that overlaps all areas of heat front C 430 among the multiple heat front 220 of the multiple epicenter 210 in the soil box 120. The same may be done with heat front B 420.

Figure 5:
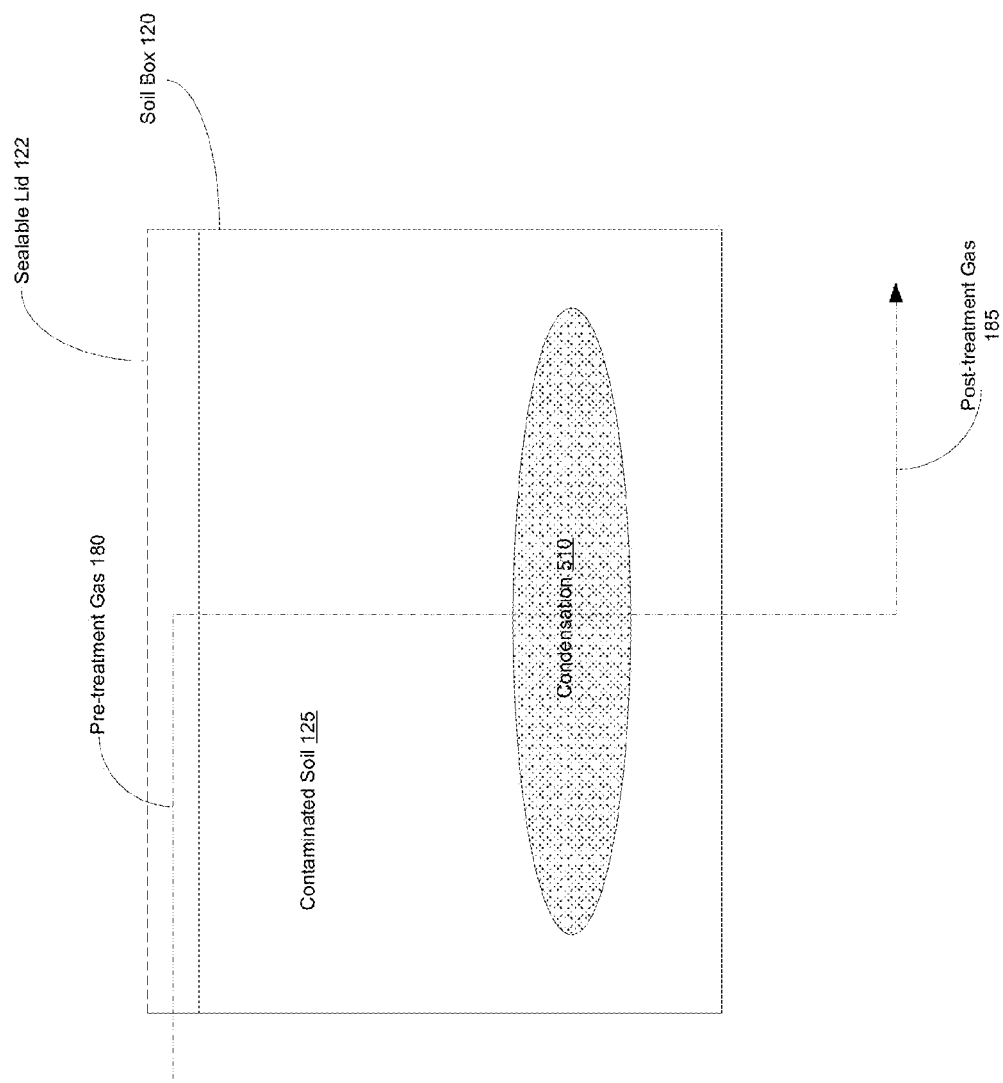
FIG. 5 illustrates a problem with condensation within a soil box that the present invention proceeds to solve, according to one or more embodiment.

FIG. 5 illustrates a problem with condensation within a soil box that the present invention proceeds to solve, according to one or more embodiment.

Particularly, FIG. 5 introduces a condensation 510 within the contaminated soil 125.

In one or more embodiment, a system of a soil evaporative desorption process is disclosed. An advantage of the present invention may be the configuration of the modular heating of FIG. 2, whereby pre-treatment gas 180 that may be used to desorb contaminated soil 125 are directly injected into the soil box 120 at multiple epicenter 210 of the top section 230 and multiple epicenter 210 of the bottom section 240. In one or more embodiment, it may be desirable to heat the one or more epicenter 210 of the bottom section 240 prior to heating the one or more epicenter 210 of the top section 230 in order to minimize or eliminate a condensation 510 that may accumulate from prior thermal desorption systems whereby pre-treatment gas 180 is injected into the top of the soil box 120 and suctioned out at the bottom of the soil box 120 at the post-treatment gas exit pathway 198.

In past systems, pre-treatment gas 180 may be passed through the top of the soil box 120 and may desorb the contaminated soil 125 near the top surface that is most exposed to the pre-treatment gas. However, as vaporized volatile contaminates comprising water and other evaporated compounds begin to flow downward towards the post-treatment gas exit pathway 198, condensation 510 may be formed due to the dense cold contaminated soil 125 located at the middle to lower portions of the soil box 120. This condensation 510 may require enormous amounts of energy in terms of pre-treatment gas 180 input and time to desiccate, and to ultimately vaporize. The present invention may minimize or potentially eliminate condensation 510 from the treatment system, in addition to providing a roadway of dedicated, heated, and/or cracked soil at the bottom section 240 of the contaminated soil 125 for vaporized contaminates at the top section 230 to flow through.

Figure 6:
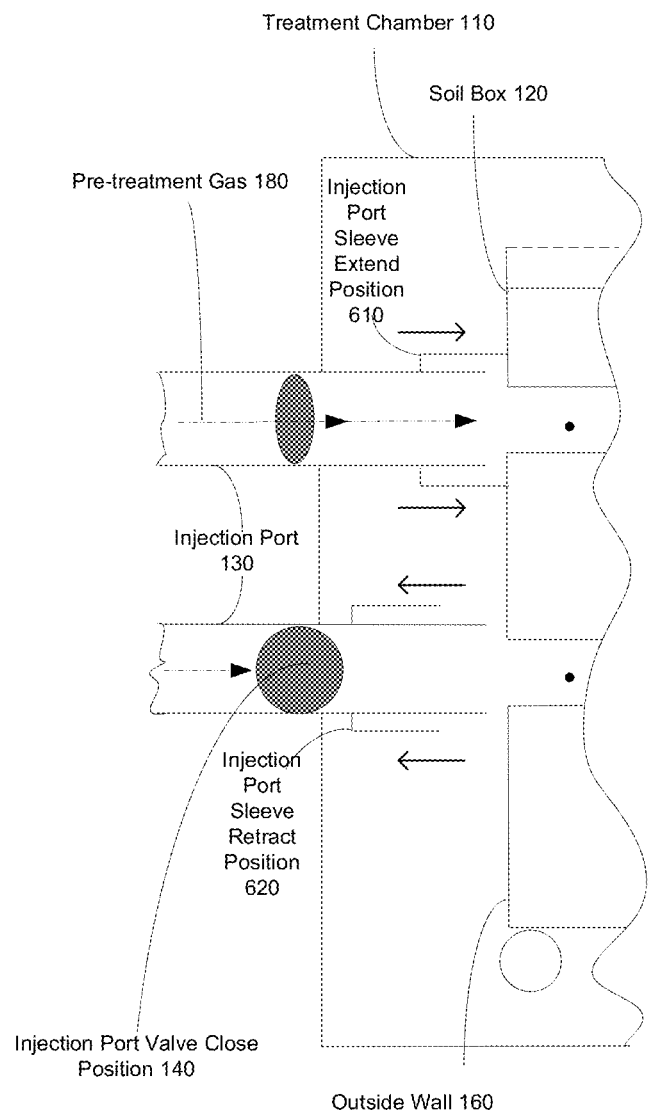
FIG. 6 details an operation of a retractable sleeve that connects an injection port to the soil box of FIG. 1, according to one or more embodiment.

FIG. 6 details an operation of the injection port sleeve 150 that connects the injection port 130 to the soil box 120 of FIG. 1, according to one or more embodiment.

Particularly, FIG. 6 details an injection port sleeve extend position 610 and an injection port sleeve retract position 620, both of which may be different configurations of the injection port sleeve 150.

The injection port sleeve extend position 610 may be used to connect the injection port 130 to the soil box 120 when the soil box 120 is mounted within the treatment chamber 110. The injection port sleeve extend position 610 may be engaged through a pneumatic piston apparatus positioned at the injection port 130 that pushes the injection port sleeve 150 into the injection port sleeve extend position 610 configuration. The injection port sleeve extend position 610 may comprise a re-sealable sealing compound at its contact edge. The sealing compound may minimize or prevent pre-treatment gas 180 leakage from the contact point between the injection port 130 and the soil box 120 when the injection port sleeve 150 is locked into position. The injection port sleeve extend position 610 and the injection port sleeve retract position 620 may both be configured in a manner that permits leakage of pre-treatment gas 180 to be contained within the treatment chamber 110 so that its adverse effect may be negligible. The injection port sleeve 150 may be configured to never be disposed beyond the treatment chamber 110 when it is in the injection port sleeve retract position 620 configuration.

In one or more alternative embodiment, the injection port sleeve 150 may not be retractable, but may be structurally fixed to the injection port 130. An expansion joint such as a bellows may be used as the injection port sleeve 150. The expansion joint may require a manual locking mechanism that locks the expansion joint onto the soil box 120 when the soil box 120 is mounted within the treatment chamber 110. The locking mechanism may be any mechanism that fastens the expansion joint onto the soil box 120, such as e.g., screw, nut and bolt, twist lock joint, door hook, and etc. A complementary manual unlocking mechanism may also be required when the soil box 120 is ready to be removed from the treatment chamber 110.

The manual lock and manual unlock of the expansion joint may be configured to automatically lock and automatically unlock, such as through an adapter positioned at the contacting edge of the expansion joint that permits the expansion joint to be engaged and disengaged from the soil box 120 through a vertical sliding motion of the soil box 120 as it is lowered and raised out of the treatment chamber 110. The automatic locking and automatic unlocking of the expansion joint may also be configured so that the expansion joint penetrates the outside wall 160 of the soil box 120 after the soil box 120 is mounted within the treatment chamber 110 and eventually expands within the soil box 120. A sleeve surrounding the expansion joint opening may prevent the expansion joint from retracting out of the soil box 120 when the expansion joint is expanded due to heat and pressure from the injection of pre-treatment gas 180.

In one or more embodiment, the injection port 130 may be positioned in a slant or diagonal position. The slanted or diagonal position may be configured in a way that the injection port 130 is pointed upward, such as e.g., a positive 45-degree angle. The slanted or diagonal position may also be configured in a way that the injection port 130 is pointed downward, such as e.g., a negative 20-degree angle. Any other configuration of the injection port 130 may be used to connect to the soil box 120 when the soil box 120 is mounted within the treatment chamber 110.

Figure 7:
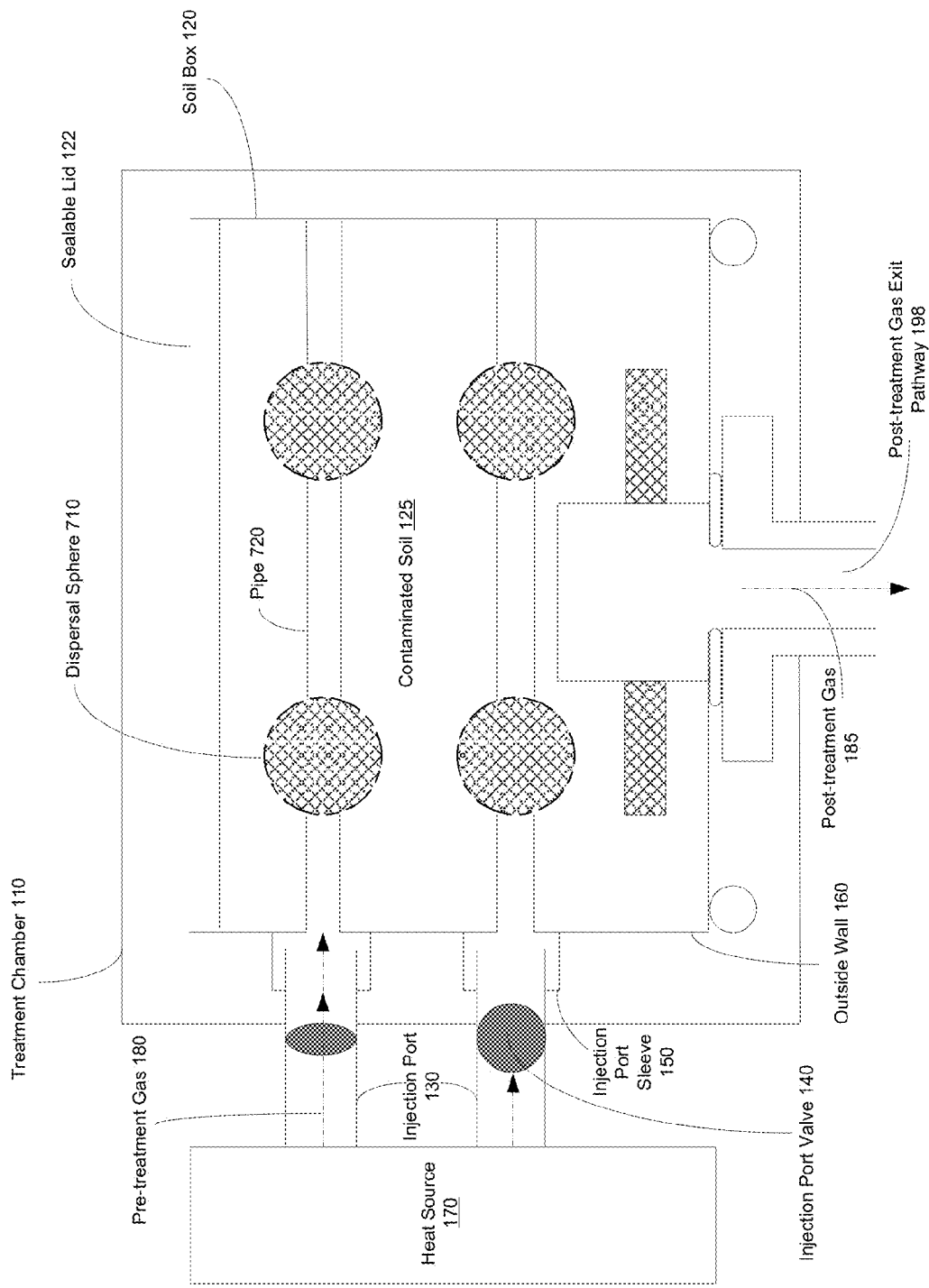
FIG. 7 is an alternative modular heating configuration of the soil box comprising spherical structures to disperse heat, according to one or more embodiment.

FIG. 7 is an alternative modular heating configuration of the soil box 120 comprising spherical structures to disperse heat, according to one or more embodiment.

Particularly, FIG. 7 introduces a dispersal sphere 710 and a pipe 720.

In one or more embodiment, pre-treatment gas 180 is directed into a soil box 120 comprising contaminated soil 125 through an injection port 130. The pre-treatment gas 180 may be heated by the heat source 170 and/or inserted such as e.g., through the addition of nitrogen gas. The pre-treatment gas 180 may be disposed into the contaminated soil 125 through the pipe 720 comprising dispersal sphere 710 used to disperse heat front 220 into the surrounding contaminated soil 120. The heat front 220 emanating from the dispersal sphere 710 may appear different than the heat front 220 emanating from the well screen 190 of FIG. 1; however, the technical idea may be the same in the sense that both heat front 220 may comprise epicenter 210. The heat front 220 may decline in temperature as it moves farther away from epicenter 210 until it reaches terminal distance 440, where it may no longer be effective in desorbing contaminated soil 125 thereafter.

The dispersal sphere 710 may be any spherical or oval structure that may be constructed of strands of metal, fiber, or other ductile materials, and may resemble a web or net in that it may have many attached or woven strands. The dispersal sphere 710 may be employed in any size measurement and count. If more than one dispersal sphere 710 is used in the system, the multiple dispersal sphere 710 may be oriented in a variety of orientations such as e.g., a single dispersal sphere 710 positioned at the top section 230 and three dispersal sphere 710 positioned at the bottom section 240, or vice versa. The pipe 720 connected to the dispersal sphere 710 may also be oriented in a variety of configurations, for example, vertically and/or diagonally with respect to the soil box 120.

Figure 8:
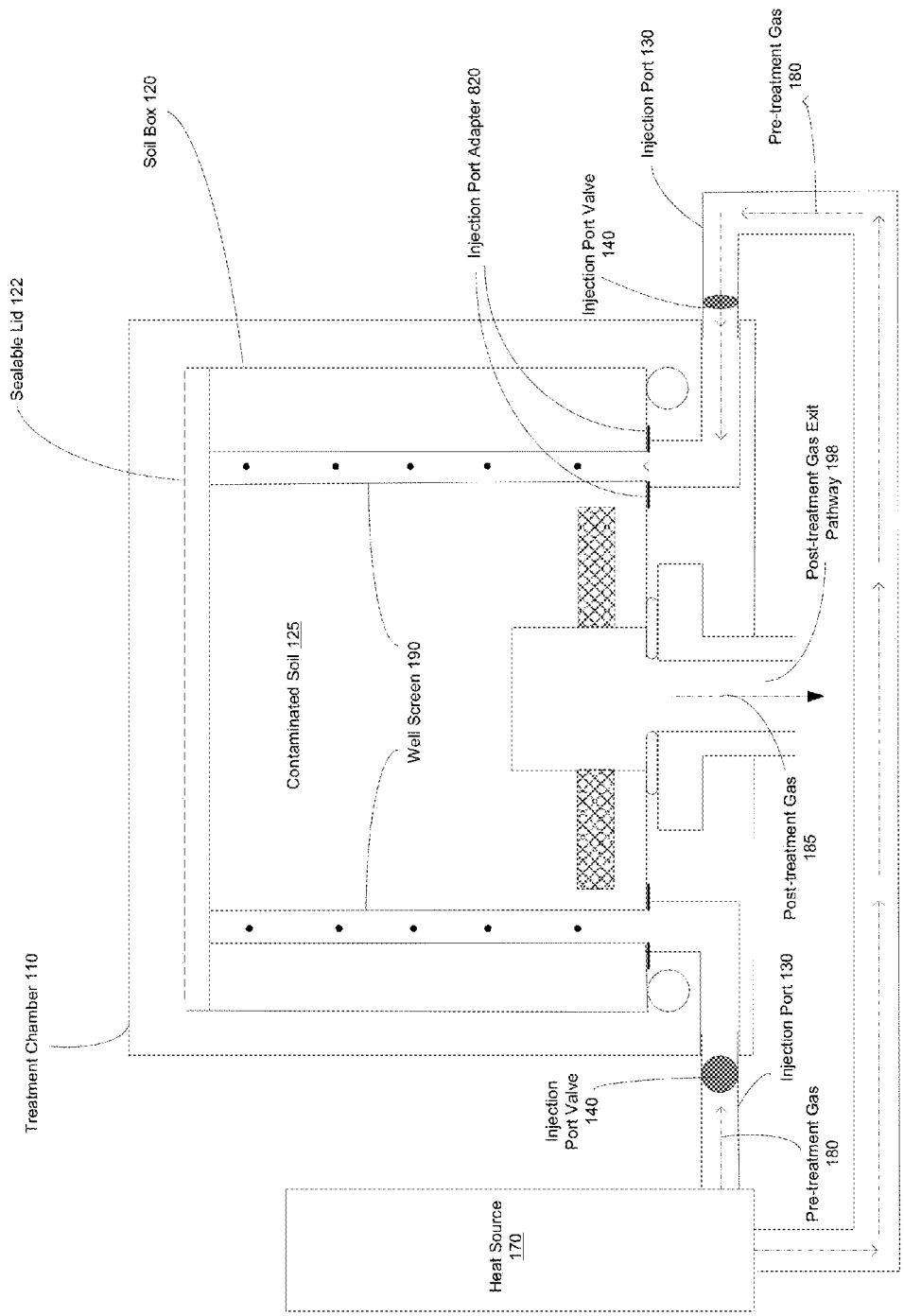
FIG. 8 is another alternative modular heating configuration of the soil box comprising injection ports connected to the bottom of the soil box, according to one or more embodiment.

FIG. 8 is another alternative modular heating configuration of the soil box 120 comprising injection port 130 connected to the bottom of the soil box 120, according to one or more embodiment.

Particularly, FIG. 8 introduces an injection port adapter 820.

In one or more embodiment, a soil evaporative desorption system is disclosed. Pre-treatment gas 180 may be heated in the heat source 170 and may be directed into the soil box 120 comprising contaminated soil 125 through injection port 130. The injection port 130 may couple with well screen 190 and/or pipe 720 through bottom openings of the soil box 120. An injection port adapter 820 may be used to dampen the impact of the soil box 120 when it is mounted within the treatment chamber 110. The mounting of the soil box 120 may automatically connect the injection port adapter 820 of the injection port 130 to soil box 120, thereby automatically coupling the injection port 130 to the well screen 190 and/or pipe 720 of the soil box 120. The weight of the soil box 120 may be sufficient in forming a seal with the injection port adapter 820. The seal may prevent leakage of pre-treatment gas 180 from the heat source 170 into the treatment chamber 110.

The well screen 190 and/or pipe 720 may be configured vertically straight from the bottom of the soil box 120 to the top of the soil box 120. In one or more alternative embodiments, the well screen 190 and/or pipe 720 may be configured in a zig-zag pattern, or a configuration with a combination of horizontal and vertical patterns.

Figure 9A:
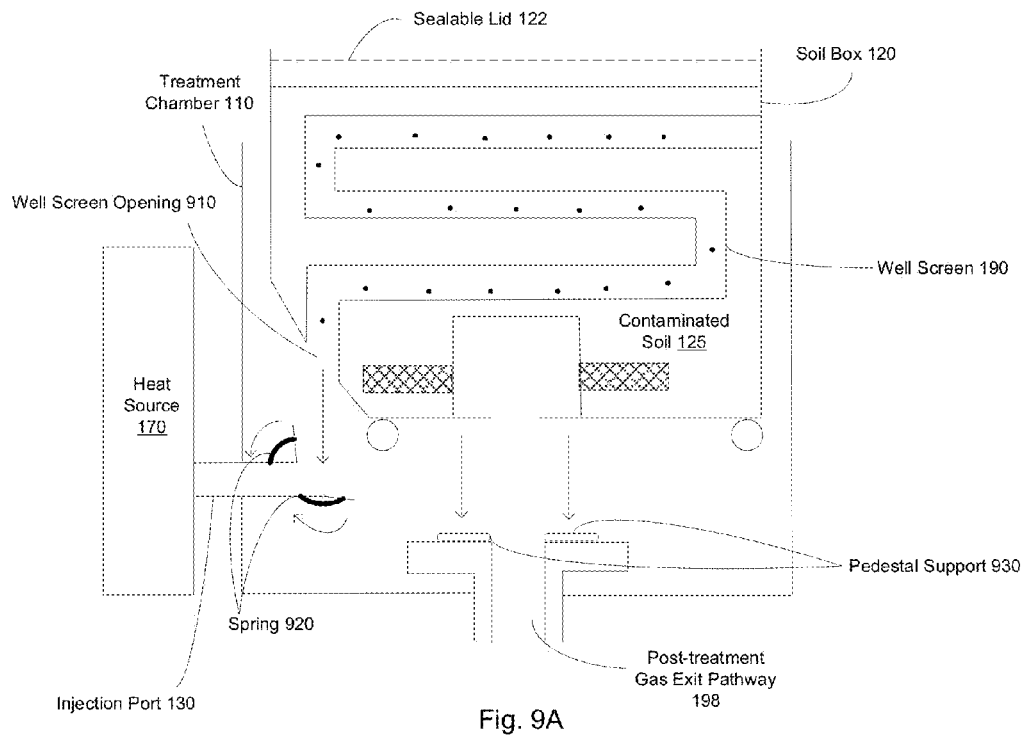
FIGS. 9A and 9B show a mounting of the soil box with yet another alternative modular heating configuration of the soil box, according to one or more embodiment.
Figure 9B:
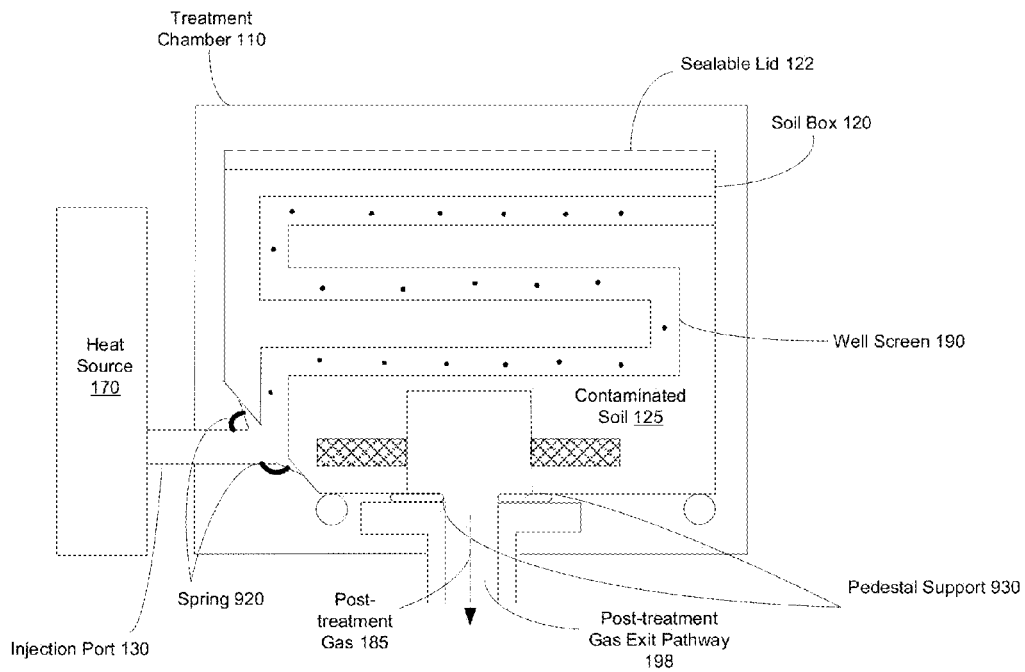

FIGS. 9A and 9B show a mounting of the soil box 120 with yet another alternative modular heating configuration of the soil box 120, according to one or more embodiment.

Particularly, FIGS. 9A and 9B introduce a well screen opening 910, a spring 920, and a pedestal support 930.

In one or more embodiment, the soil box 120 may comprise contaminated soil 125 and may be mounted within a treatment chamber 110. Pre-treatment gas 180 may pass through the injection port 130 from the heat source 170 into well screen 190 and/or pipe 720 of the soil box 120. The epicenter 210 may dispose heat front 220 into contaminated soil 125. The well screen 190 and/or pipe 720 may comprise the well screen opening 910 that may be configured to couple with the injection port 130. When the soil box 120 is mounted within the treatment chamber 110, the edge of the soil box 120 comprising the well screen opening 910 may contact flanges located at the contact edge of the injection port 130. The flanges comprising spring 920 may be pushed towards the side walls of the injection port 130 due to the weight of the soil box 120. The flanges of the injection port 130 may comprise a seal to prevent pre-treatment gas leakage into the treatment chamber 110.

The flanges may be configured as an opening of the injection port 130 that may be wider than the well screen opening 910. The counteracting forces between gravity of soil box 120 and the potential energy of the spring 920 may form a seal between the injection port 130 and the well screen opening 910. The pedestal support 930 may support the weight of the soil box 120 and may prevent damage to the injection port 130 and its flanges from the downward force of the soil box 120. When the soil box 120 is removed from the treatment chamber 110, the spring 920 may exert its potential energy to move the flanges back into its original resting position.

In one or more alternative embodiments, the flanges may be immovably fixed to the injection port 130. The well screen opening 910 of the soil box 120 may be configured to couple with the injection port 130 without the need for spring 920. The flanges may be configured as an opening of the injection port 130 that may be wider than the well screen opening 910. The flanges of the injection port 130 may comprise a seal to prevent pre-treatment gas leakage into the treatment chamber 110. The pedestal support 930 may support the weight of the soil box 120 and may prevent damage to the injection port 130 and its flanges from the downward force of the soil box 120.

In other embodiments, the injection port 130 may not comprise of flanges. The well screen opening 910 of the soil box 120 may be coupled directly to the injection port 130 when the soil box 120 is mounted within the treatment chamber 110. The pedestal support 930 may support the weight of the soil box 120 and may prevent damage to the injection port 130 from the downward force of the soil box 120. The opening of the injection port 130 may be larger than the opening of the well screen opening 910.

Figure 10A:
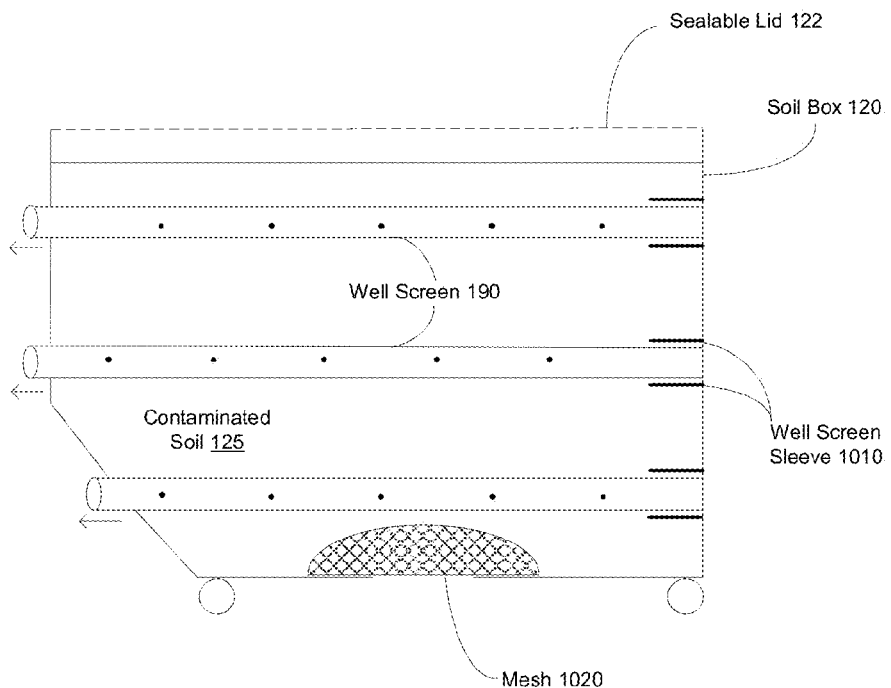
FIGS. 10A and 10B illustrate alternative configurations of the soil box, according to one or more embodiment.
Figure 10B:
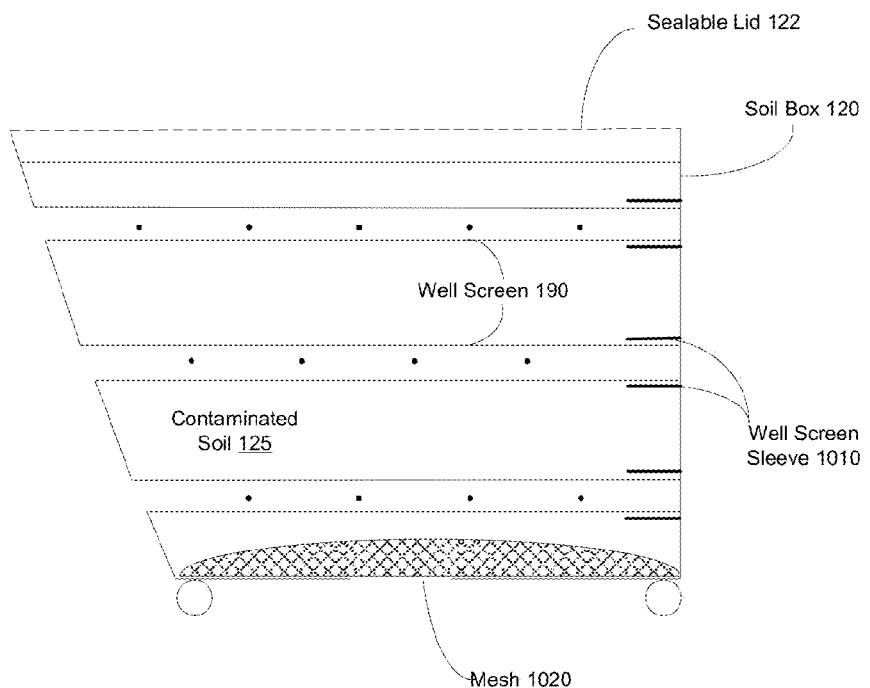

FIGS. 10A and 10B illustrate alternative configurations of the soil box 120, according to one or more embodiment.

Particularly, FIGS. 10A and 10B introduces a well screen sleeve 1010 and a mesh 1020.

The well screen sleeve 1010 may be configured to hold the well screen 190 vertically in place. The well screen 190 may be removable, while the well screen sleeve 1010 may allow for easy installation of the well screen 190. The well screen 190 may extend beyond the soil box 120 for ease of handling, particularly when the well screen 190 is hot due to usage. A technician may want to replace or refurbish well screen 190 that may be clogged or defective. The diameter of the portion of the well screen 190 that extends beyond the soil box 120 may be smaller than the diameter of the injection port 130, injection port sleeve 150 and/or the injection port 130 flange. The length of the portion of the well screen 190 that extends beyond the soil box 120 may be configured to not make direct contact with the injection port 130, injection port sleeve 150 and/or the injection port 130 flange.

In one or more embodiment, the well screen 190 may not have a portion that extends beyond the soil box 120. The edge of the well screen 190 that may not be supported by the well screen sleeve 1010 may be flushed with the corresponding edge of the soil box 120. The edge of the well screen 190 that is not supported by the well screen sleeve 1010 may be supported by a different set of sleeves or brackets. In addition to being supported by the well screen sleeve 1010, the well screen 190 may be locked into position such as, e.g. bolted or screwed onto the soil box 120 at the edge of the soil box 120 comprising the well screen sleeve 1010, so that the well screen 190 may not slide horizontally loose due to vibrations from operation, according to one or more embodiment.

The mesh 1020 may be a barrier made of connected strands of metal, fiber, or other ductile materials that may resemble a web or net in that it may have many attached or woven strands. The mesh 1020 may be operable to permit post-treatment gas 185 to flow through from the contaminated soil 125 into the post-treatment gas exit pathway 198 and may screen out dust, soil, silt, clay, sand, rocks, and other solid materials within the contaminated soil 125. The mesh 1020 may allow for higher air conductance and velocity for the pre-treatment gas 180 to flow through due to its large surface area that may be in contact with the contaminated soil 125. The top, dome-shaped surface of the mesh 1020 may provide compressive strength to the mesh 1020 in addition to the said large surface area that may be in contact with the contaminated soil 125. Additionally, the top, dome-shaped surface of the mesh 1020 may be configured with a distance away from the opening of the post-treatment gas exit pathway 198 that is sufficient to keep dust, soil, silt, clay, sand, rocks, and other solid material from clogging the opening of the post-treatment gas exit pathway 198. The distance from the top, dome-shaped surface of the mesh 1020 to the opening of the post-treatment gas exit pathway 198 may be 5 inches to 12 inches such as e.g., 7 inches or 9 inches.

FIG. 11 is yet another alternative modular heating configuration of the soil box 120 comprising only a single epicenter 210 and a single heat front 220, according to one or more embodiment.

Particularly, FIG. 11 introduces a distance A 1110, a distance B 1120, and a reference line 1130.

In one or more embodiment, the soil box 120 of a thermal desorption system may comprise the modular heating configuration as described in FIG. 2. The modular heating configuration may also comprise only the single epicenter 210 and the single heat front 220, wherein the single epicenter 210 and the single heat front 220 may be situated above the midpoint of the soil box 120, e.g. closer to the top of the soil box 120 than the bottom of the soil box 120. Distance A 1110 may represent the distance between the single epicenter 210 and the top of the soil box 120, e.g. the sealable lid 122. Distance B 1120 may represent the distance between the single epicenter 210 and the bottom surface of the soil box 120. Reference line 1130 may be a line that represents the vertical location of the soil box 120. The reference line 1130 may allow for ease of comparison between distance A 1110 and distance B 1120.

In one or more embodiment, the single epicenter 210 may be situated closer to the top of the soil box 120 such that distance A 1110 is less than distance B 1130. This configuration of the epicenter 210 may allow volatile contaminates within the contaminated soil 125 to vaporize and then to flow downward towards the post-treatment gas exit pathway 198. A gas extraction fan may provide negative pressure from within the soil box 120, therefore pulling the heat front 220 and any vaporized contaminates downward when the negative pressure is applied to the soil box 120. The downward-pulled heat front 220 may further desorb contaminated soil 125 residing below the epicenter 210. A desirable ratio between the distance A 1110 and the distance B 1130 may be any ratio less than 1/1 (1.0), such as e.g., 1/2 (0.5) or 1/3 (0.33).

Figure 12A:
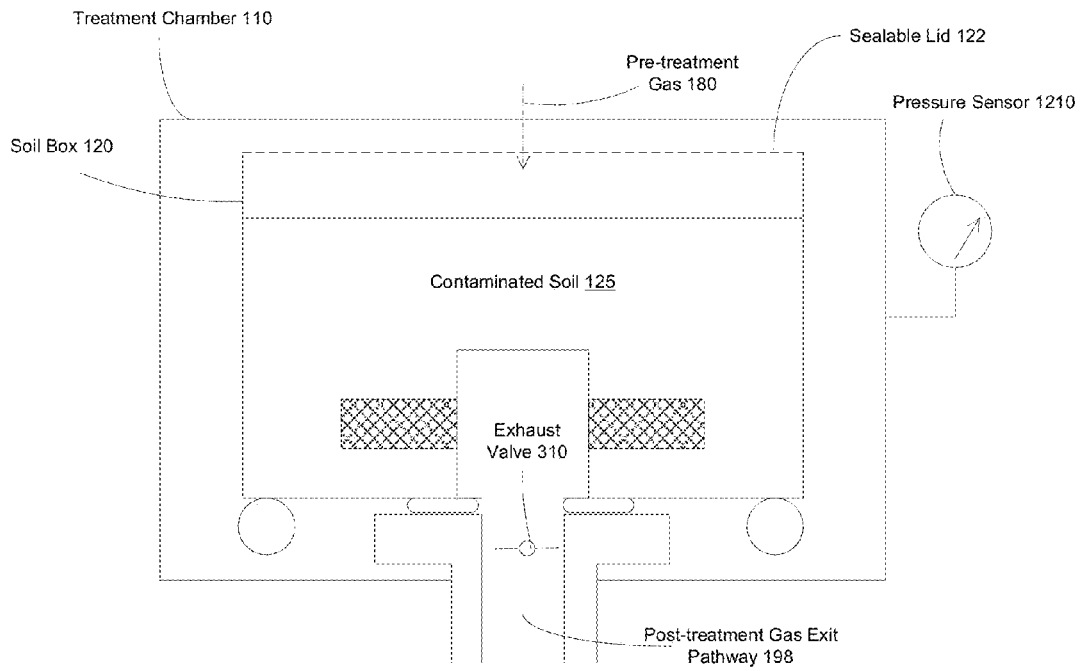
FIGS. 12A and 12B illustrate a system and process for cyclic thermal desorption, according to one or more embodiment.
Figure 12B:
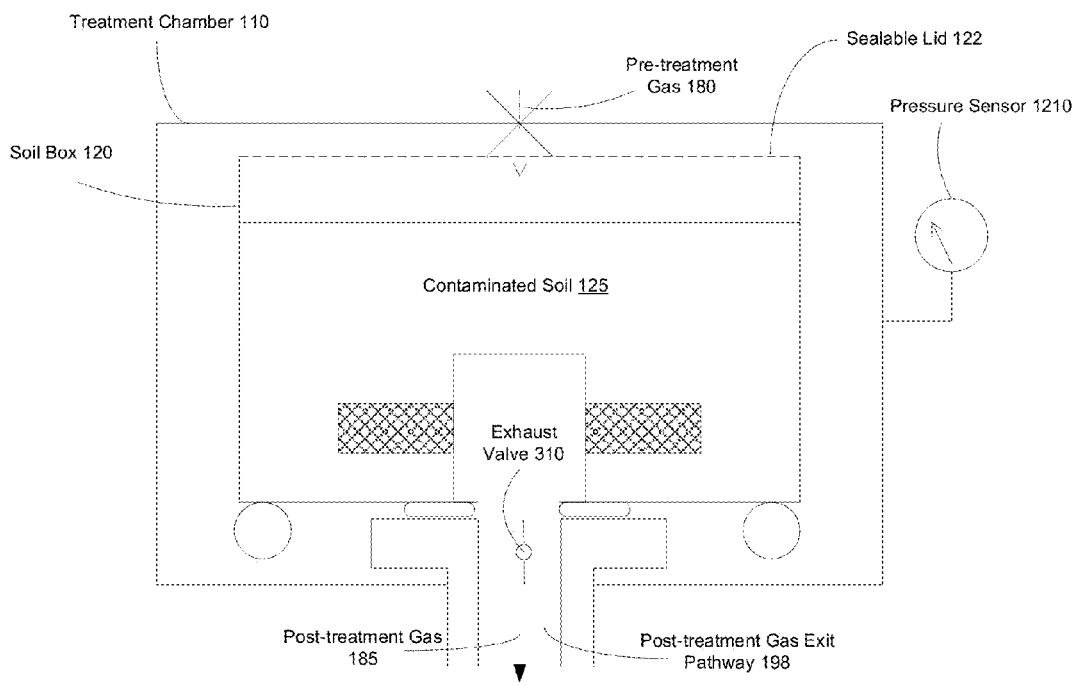

FIGS. 12A and 12B illustrate a system and process for cyclic thermal desorption, according to one or more embodiment.

Particularly, FIGS. 12A and 12B introduces a pressure sensor 1210.

In one or more embodiment, a system and process for a cyclic thermal desorption is disclosed. The soil box 120 may be configured to hold contaminated soil 125, and may be placed in the treatment chamber 110. Pre-treatment gas 180 may be provided to the treatment chamber 110, for example, to heat the contaminated soil 125 to vaporize the volatile contaminants. The exhaust valve 310 may be closed, for example, to increase pressure in the soil box 120 and/or the treatment chamber 110. After the soil box 120 and/or the treatment chamber 110 reaches a certain pressure, for example, atmospheric pressure or above atmospheric pressure (e.g., more than 1 bar pressure, such as 2-10 bar), the exhaust valve 310 may open, which may lower the pressure in the soil box 120 and/or the treatment chamber 110. The process may be repeated until the contaminated soil 125 is cleaned. During the time that the exhaust valve 310 is open, the pre-treatment gas 180 may continue to flow, or may be shut off.

In one or more embodiment, the post-treatment gas exit pathway 198 coupled to the exhaust valve 310 may be open to atmospheric pressure, or may be coupled to a vacuum assembly such as the gas extraction fan. For the post-treatment gas exit pathway 198 open to atmospheric pressure, the pressure within the soil box 120 and/or the treatment chamber 110 may be higher than atmospheric pressure. For the post-treatment gas exit pathway 198 coupled to the vacuum assembly, the pressure within the soil box 120 and/or the treatment chamber 110 may be at or higher than atmospheric pressure.

Figure 13:
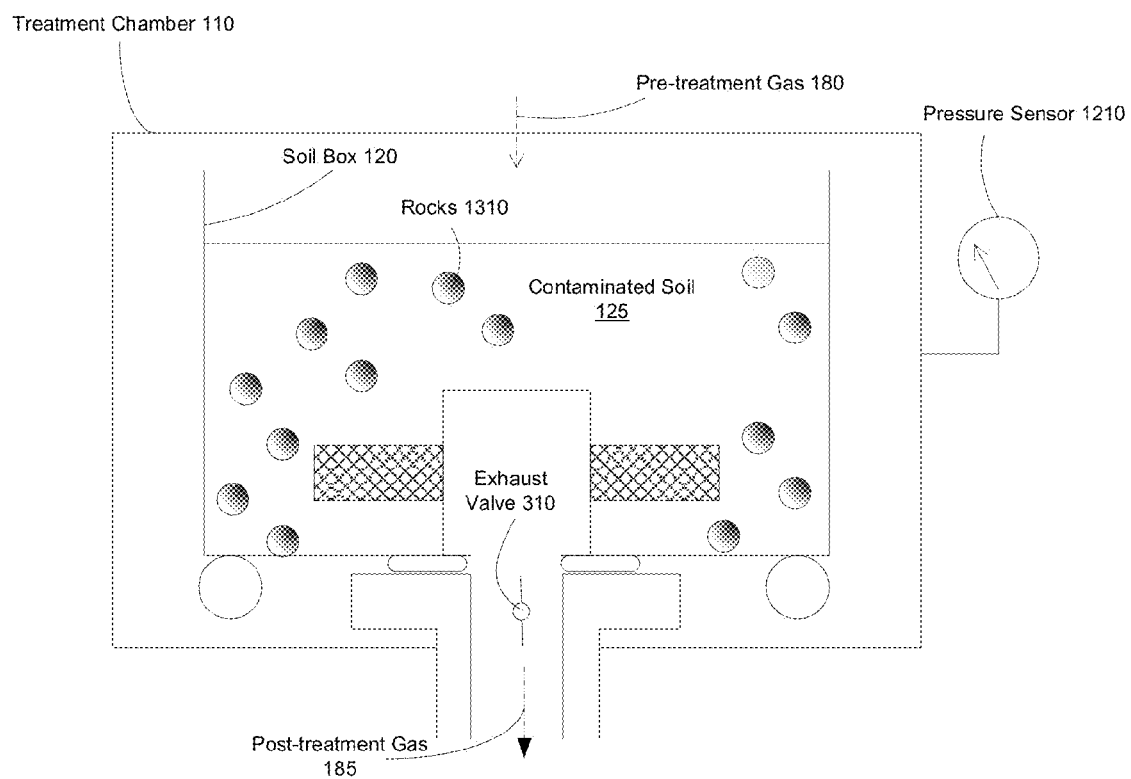
FIG. 13 illustrates a soil configuration for cyclic thermal desorption, according to one or more embodiment.

FIG. 13 illustrates a soil configuration for cyclic thermal desorption, according to one or more embodiment.

Particularly, FIG. 13 introduces a rocks 1310.

In one or more embodiment, a soil configuration for cyclic thermal desorption process is disclosed. A soil box 120 may be configured to hold contaminated soil 125, and may be placed in a treatment chamber 110. Rocks 1310 may be provided in the soil box 120 to improve the flow conductance through the soil box 120. The high flow conductance, provided by the rocks 1310, may assist in the release of pressure from the treatment chamber 110, which may improve the throughput of the cyclic thermal desorption process.

The rocks 1310 may be pre-mixed with the contaminated soil 125 before placing the mixture into the soil box 120. The rocks 1310 may be of any size and shape that sufficiently increases flow conductance e.g., between 1 centimeter and 2 inches, such as 1 inch. The rocks 1310 may be a mixture of a variety of rocks 1310 with different sizes and shapes. The rocks 1310 may also be added into the soil box 120 prior to placing contaminated soil 125 into the soil box 120 such that the rocks 1310 may reside at the bottom of the soil box 120. The rocks 1310 residing at the bottom of the soil box 120 may improve flow conductance near the opening of the post-treatment gas exit pathway 198.

Figure 14:
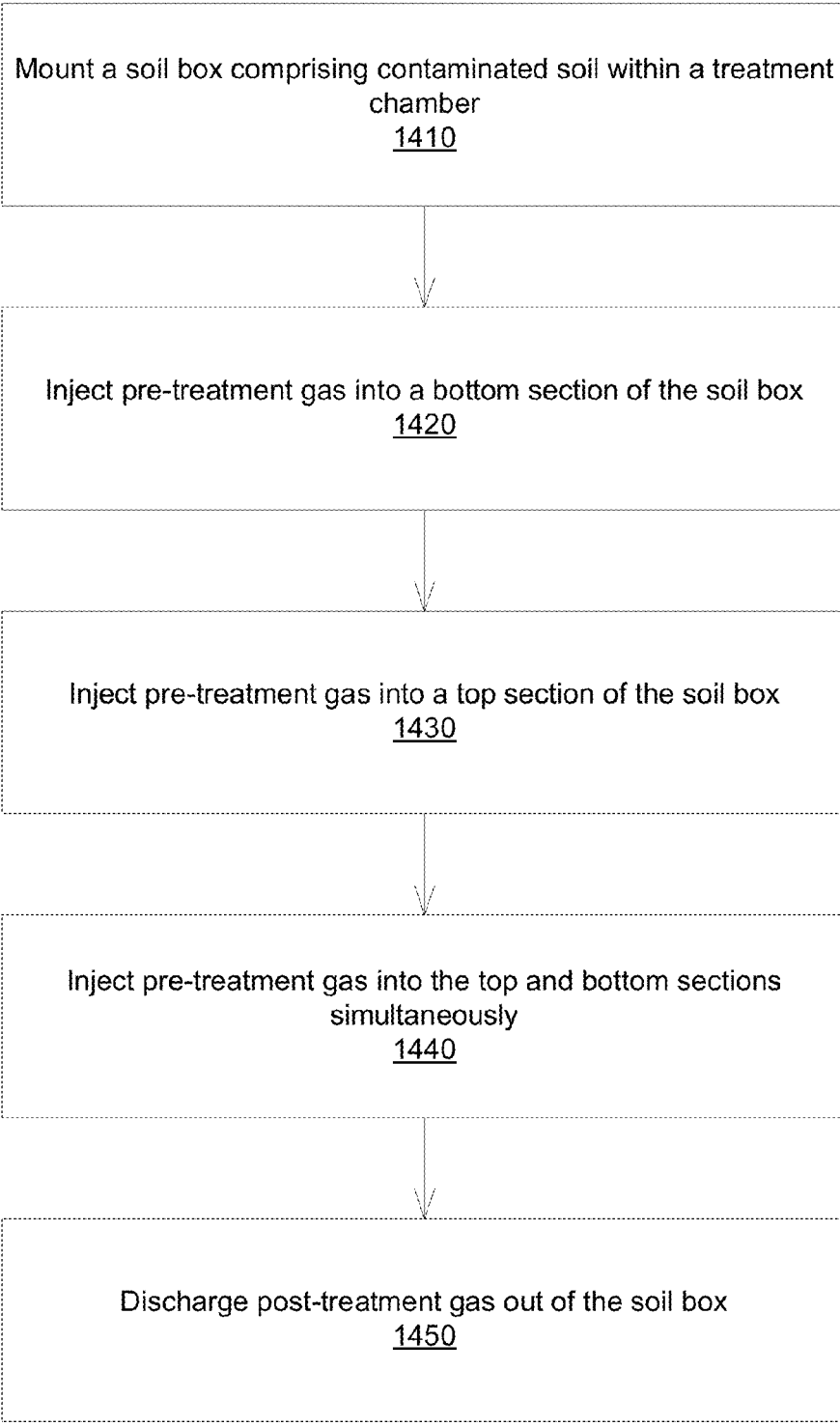
FIG. 14 is a flowchart of a method of distributing pre-treatment gas into sections of the soil box, according to one or more embodiment.

FIG. 14 is a flowchart of a method of distributing pre-treatment gas 180 into sections of the soil box 120, according to one or more embodiment.

Particularly, in FIG. 14, operation 1410 may mount the soil box 120 comprising contaminated soil 125 within the treatment chamber 110. The treatment chamber 110 and/or the soil box 120 may be heat insulated and/or sealed to hold pressure. The contaminated soil 125 may comprise condensable hydrocarbon contaminates and/or non-condensable hydrocarbon contaminates. Operation 1420 may inject pre-treatment gas 180 into the bottom section 240 of the soil box 120. The bottom section 240 may comprise one or more epicenter 210 to dispose one or more heat front 220 into the surrounding contaminated soil 125. Operation 1430 may then inject pre-treatment gas 180 into the top section 230 of the soil box 120. The top section 230 may comprise of one or more epicenter 210 to dispose one or more heat front 220 into the surrounding contaminated soil 125. Thereafter, operation 1440 may inject pre-treatment gas into the top section 230 and the bottom section 240 simultaneously. Operation 1440 may function as a final rinse to completely desorb all residual contaminates from the contaminated soil 125. A fresh air rinse of atmospheric air may also be added to the process after operation 1440. Operation 1450 may discharge post-treatment gas 185 out of the soil box 120. The post-treatment gas 185 may comprise condensable hydrocarbon contaminates and/or non-condensable hydrocarbon contaminates.

FIG. 15 is a flowchart of a method of injecting pre-treatment gas 180 into the soil box 120, according to one or more embodiment.

Particularly, in FIG. 15, operation 1510 may mount the soil box 120 comprising contaminated soil 125 within the treatment chamber 110. The treatment chamber 110 and/or the soil box 120 may be heat insulated and/or sealed to hold pressure. The contaminated soil 125 may comprise condensable hydrocarbon contaminates and/or non-condensable hydrocarbon contaminates. Operation 1520 may inject pre-treatment gas 180 into the soil box 120 sequentially through the one or more injection port 130. Any combination and sequence of disposing the one or more heat front 220 from the one or more epicenter 210 at the top section 230 and at the bottom section 240 of the soil box 120 may be deployed. Operation 1530 may progressively increase or progressively decrease the temperature of the pre-treatment gas 180. The progressive increasing or progressive decreasing of the temperature of the pre-treatment gas 180 may be mechanically and/or electronically controlled through the heat source 170. Operation 1540 may discharge post-treatment gas 185 out of the soil box 120. The post-treatment gas 185 may comprise condensable hydrocarbon contaminates and/or non-condensable hydrocarbon contaminates.

Figure 16:
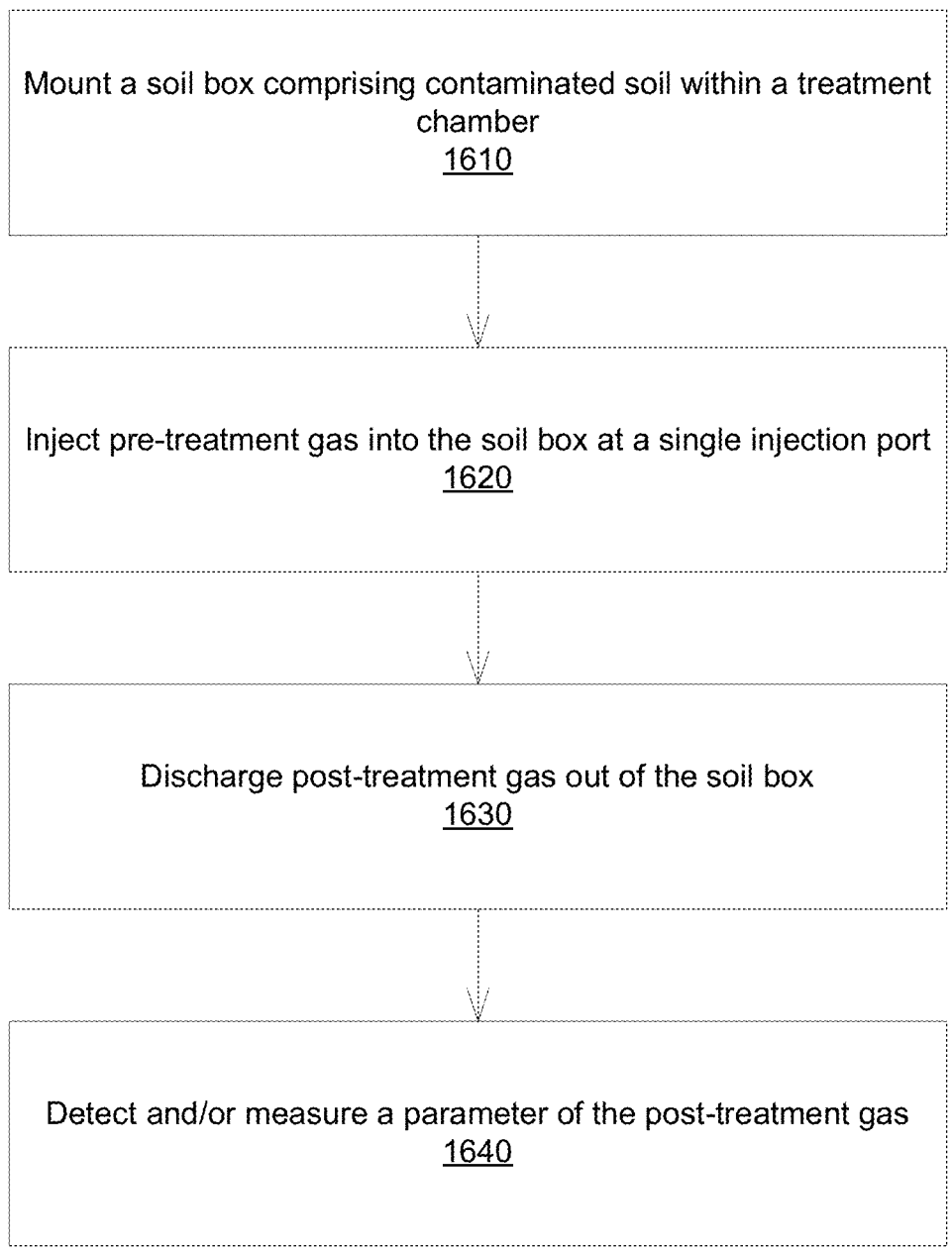
FIG. 16 is a flowchart of a method of detecting and/or measuring a parameter of the post-treatment gas, according to one or more embodiment.

FIG. 16 is a flowchart of a method of detecting and/or measuring a parameter of the post-treatment gas 185, according to one or more embodiment.

Particularly, in FIG. 16, operation 1610 may mount the soil box 120 comprising contaminated soil 125 within the treatment chamber 110. The treatment chamber 110 and/or the soil box 120 may be heat insulated and/or sealed to hold pressure. The contaminated soil 125 may comprise condensable hydrocarbon contaminates and/or non-condensable hydrocarbon contaminates. Operation 1620 may inject pre-treatment gas 180 into the soil box 120 through a single injection port 130. A single epicenter 210 corresponding to the single injection port 130 disposes a single heat front 220 into the surrounding contaminated soil 125, thereby desorbing it. Operation 1630 may discharge post-treatment gas 185 out of the soil box 120. The post-treatment gas 185 may comprise condensable hydrocarbon contaminates and/or non-condensable hydrocarbon contaminates. Operation 1640 may detect and/or measure one or more parameter of the post-treatment gas 185 using the parameter sensor 320. Data from the parameter sensor 320 may detail the characteristics of the contaminated soil 125 at the single area where the epicenter 210 disposed heat front 220. Further actions may be taken based upon the data outputted from the parameter sensor 320, such as re-running a treatment cycle on a soil batch if a high carbon monoxide reading is outputted from the parameter sensor 320. A high carbon monoxide output reading may indicate that the desorption process is incomplete or inefficient.

FIG. 17 is a flowchart of a method of raising pressure within the soil box 120 before discharging the post-treatment gas 185 using an exhaust valve 310, according to one or more embodiment.

Particularly, in FIG. 17, operation 1710 may mount the soil box 120 comprising contaminated soil 125 within the treatment chamber 110. The treatment chamber 110 and/or the soil box 120 may be heat insulated and/or sealed to hold pressure. The contaminated soil 125 may comprise condensable hydrocarbon contaminates and/or non-condensable hydrocarbon contaminates. Operation 1720 may close an exhaust valve 310 at the post-treatment gas exit pathway 198. Then, operation 1730 may inject pre-treatment gas 180 into the soil box 120, which may raise its pressure due to the closed exhaust valve 310. Temperature of the pre-treatment gas 180 may also be raised, either mechanically at the heat source 170 and/or electronically through the controller 172. Operation 1740 may open the exhaust valve 310 at the post-treatment gas exit pathway 198. Pre-treatment gas 180 may continue to be injected through the injection port 130 when the exhaust valve 310 is open, or it may be shut off. Operation 1750 may discharge post-treatment gas 185 out of the soil box 120. The post-treatment gas 185 may comprise condensable hydrocarbon contaminates and/or non-condensable hydrocarbon contaminates.

FIG. 18 is a flowchart of a method of maintaining pressure within the soil box 120 before discharging the post-treatment gas 185 using the exhaust valve 310, according to one or more embodiment.

Particularly, in FIG. 18, operation 1810 may mount the soil box 120 comprising contaminated soil 125 within the treatment chamber 110. The treatment chamber 110 and/or the soil box 120 may be heat insulated and/or sealed to hold pressure. The contaminated soil 125 may comprise condensable hydrocarbon contaminates and/or non-condensable hydrocarbon contaminates. Operation 1820 may close an exhaust valve 310 at the post-treatment gas exit pathway 198. Then, operation 1830 may inject pre-treatment gas 180 into the soil box 120, which may raise its pressure due to the closed exhaust valve 310. Temperature of the pre-treatment gas 180 may also be raised, either mechanically at the heat source 170 and/or electronically through the controller 172. Operation 1840 may stop the injection of pre-treatment gas 180 into the soil box 120, which may maintain its pressure and temperature. Operation 1850 may open the exhaust valve 310 at the post-treatment gas exit pathway 198. Pre-treatment gas 180 may continue to be injected through the injection port 130 when the exhaust valve 310 is open, or it may be shut off. Operation 1860 may discharge post-treatment gas 185 out of the soil box 120. The post-treatment gas 185 may comprise condensable hydrocarbon contaminates and/or non-condensable hydrocarbon contaminates.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A thermal desorption soil remediation system, comprising:
    a treatment chamber;
    at least one injection port coupled to the treatment chamber when a soil box is mounted within the treatment chamber, wherein the at least one injection port is configured to direct pre-treatment gas from a source into the treatment chamber,
        wherein a heat front from the pre-treatment gas is used to desorb contaminated soil in the soil box;
    a top section comprising at least one injection port and a bottom section comprising at least one injection port when two or more injection ports are used,
        wherein the bottom section is configured to receive pre-treatment gas before the top section; and
    an exhaust valve positioned at a post-treatment gas exit pathway configured to release post-treatment gas from the soil box in a manner that permits the treatment chamber to alternate between a pressurized state and a pressure releasing state.

2. A system of claim 1, further comprising:
    wherein a parameter of the post-treatment gas is measured after a single injection port directs pre-treatment gas into the soil box.

3. A system of claim 1, further comprising:
    wherein the top section only receives pre-treatment gas after completion of treatment at the bottom section.

4. A system of claim 1, further comprising:
    wherein the top section and the bottom section simultaneously receive pre-treatment gas after the completion of treatment at the top section and at the bottom section.

5. A system of claim 1, further comprising:
    wherein the at least one injection port directs pre-treatment gas into the soil box in a pulsing manner.

6. A system of claim 1, further comprising:
    wherein the at least one injection port are independently controlled when two or more injection ports are used.

7. A system of claim 1, further comprising:
    wherein the at least one injection port directs pre-treatment gas into the soil box sequentially when two or more injection ports are used.

8. A system of claim 1, further comprising:
    wherein temperature of the pre-treatment gas progressively decreases through successive pre-treatment gas injections.

9. A system of claim 1, further comprising:
    wherein pressure within the soil box progressively increases through successive pre-treatment gas injections.

10. A system of claim 1, further comprising:
    wherein the heat front has a maximum terminal distance of 24 inches.

11. A thermal desorption soil remediation method, comprising:
    mounting a soil box comprising contaminated soil within a treatment chamber;
    injecting pre-treatment gas into a bottom section of the soil box prior to injecting pre-treatment gas into a top section of the soil box, wherein a heat front from the pre-treatment gas is used to desorb contaminated soil in the soil box;
    releasing post-treatment gas from the soil box in a manner that permits the soil box to alternate between a pressurized state and a pressure-releasing state; and
    retracting a retractable sleeve when a door of the treatment chamber is open.

12. A method of claim 11, further comprising:
    measuring a parameter of the post-treatment gas after a single injection port directs pre-treatment gas into the soil box.

13. A method of claim 11, further comprising:
    wherein the heat front has a maximum terminal distance of 18 inches.

14. A method of claim 11, further comprising:
    wherein pressure within the treatment chamber progressively increases through successive pre-treatment gas injections.

15. A method of claim 11, further comprising:
    wherein temperature of the pre-treatment gas progressively decreases through successive pre-treatment gas injections.

* * * * *